(12) United States Patent
Nahas et al.

(10) Patent No.: US 9,284,228 B2
(45) Date of Patent: Mar. 15, 2016

(54) COMMUNICATION DEVICE

(71) Applicant: Saint-Gobain Centre De Recherches Et D'Etudes Europeen, Courbevoie (FR)

(72) Inventors: Nabil Nahas, Serris (FR); Daniel Urffer, Saint Saturain des Avignon (FR)

(73) Assignee: SAINT-GOBAIN CENTRE DE ECHERCHES ET D'ETUDES EUROPEEN, Courbevoie (FR)

( * ) Notice: Subject to any disclaimer, the term of this patent is extended or adjusted under 35 U.S.C. 154(b) by 19 days.

(21) Appl. No.: 14/368,025

(22) PCT Filed: Dec. 20, 2012

(86) PCT No.: PCT/IB2012/057511
§ 371 (c)(1),
(2) Date: Jun. 23, 2014

(87) PCT Pub. No.: WO2013/093822
PCT Pub. Date: Jun. 27, 2013

(65) Prior Publication Data
US 2014/0342900 A1 Nov. 20, 2014

(30) Foreign Application Priority Data
Dec. 23, 2011 (FR) ...................... 11 62382

(51) Int. Cl.
*C04B 35/49* (2006.01)
*C04B 35/488* (2006.01)
*C04B 35/111* (2006.01)
*C04B 35/64* (2006.01)
*H04B 1/3888* (2015.01)
*H04M 1/18* (2006.01)

(52) U.S. Cl.
CPC ........... *C04B 35/4885* (2013.01); *C04B 35/111* (2013.01); *C04B 35/488* (2013.01); *C04B 35/64* (2013.01); *H04B 1/3888* (2013.01); C04B 2235/3201 (2013.01); C04B 2235/3206 (2013.01); C04B 2235/3208 (2013.01); C04B 2235/3222 (2013.01); C04B 2235/3224 (2013.01); C04B 2235/3232 (2013.01); C04B 2235/3246 (2013.01); C04B 2235/3248 (2013.01); C04B 2235/3272 (2013.01); C04B 2235/3275 (2013.01); C04B 2235/3418 (2013.01); C04B 2235/3427 (2013.01); C04B 2235/3445 (2013.01); C04B 2235/3463 (2013.01); C04B 2235/3481 (2013.01); C04B 2235/36 (2013.01); C04B 2235/3869 (2013.01); C04B 2235/5296 (2013.01); C04B 2235/5409 (2013.01); *C04B 2235/5436* (2013.01); *C04B 2235/5445* (2013.01); C04B 2235/612 (2013.01); C04B 2235/656 (2013.01); *C04B 2235/72* (2013.01); C04B 2235/762 (2013.01); C04B 2235/763 (2013.01); C04B 2235/768 (2013.01); C04B 2235/77 (2013.01); *C04B 2235/785* (2013.01); C04B 2235/786 (2013.01); C04B 2235/80 (2013.01); C04B 2235/85 (2013.01); C04B 2235/87 (2013.01); *C04B 2235/9661* (2013.01); *H04M 1/185* (2013.01)

(58) Field of Classification Search
CPC .... C04B 35/486; C04B 35/48; C04B 35/481; C04B 35/482; C04B 35/4885
USPC .................................. 501/102–105
See application file for complete search history.

(56) References Cited

U.S. PATENT DOCUMENTS

| | | | | |
|---|---|---|---|---|
| 4,804,644 A * | 2/1989 | Anseau | ................. | C04B 35/481 501/105 |
| 4,820,666 A | 4/1989 | Hirano et al. | | |
| 5,023,216 A * | 6/1991 | Anseau | ................. | C04B 35/597 501/103 |
| 7,724,532 B2 * | 5/2010 | Zadesky | ................ | H04M 1/026 361/752 |
| 2006/0268528 A1 | 11/2006 | Zadesky et al. | | |

FOREIGN PATENT DOCUMENTS

FR 2579199 A1 9/1986

OTHER PUBLICATIONS

K. Morita et al: "Synthesis of Dense Nanocrystalline ZrO2—Mg Al2O4 Spinel Composite", Scripta Materialia, Elsevier, Amsterdam, NO, vol. 53, No. 9, Nov. 1, 2005, pp. 1007-1012, XP025398473. Chapter 2.1. "Material preparation"; figures 1-4.
International Search Report dated Apr. 16, 2013.

* cited by examiner

*Primary Examiner* — Noah Wiese
(74) *Attorney, Agent, or Firm* — Cooper Legal Group, LLC

(57) ABSTRACT

The invention relates to a communication device using radio waves with frequencies of 800 MHz to 3 GHz, comprising a ceramic cover at least partially exposed to the external environment of the device, at least one portion of said waves passing therethrough during the use of the device, said cover being at least partially made of a sintered product having a chemical composition such as, by weight and for a total of 100%, $32\% \leq ZrO_2 \leq 95\%$, $1\% < Y2O3+CeO2+Sc_2O_3+MgO+CaO$, $0\% \leq CeO_2 \leq 26\%$, $0\% \leq MgO \leq 43\%$, $0\% \leq CaO \leq 37\%$, $0\% \leq SiO_2 \leq 41\%$, $0\% \leq Al_2O_3 \leq 55\%$, $0\% \leq TiO_2 \leq 30\%$, $0\% \leq$ lanthanide oxide, except for $CeO_2 \leq 50\%$ $0\%$ $SrO \leq 24\%$, $o\% \leq iAlON$ compounds $\leq 50\%$, and other compounds $\leq 15\%$.

20 Claims, No Drawings

COMMUNICATION DEVICE

TECHNICAL FIELD

The invention relates to a device for communication by radio waves having frequencies of between 800 MHz and 3 GHz and comprising a ceramic housing through which at least a portion of said waves passes during the use of the device.

TECHNOLOGICAL BACKGROUND

US 2006/0268528 describes examples of such a device, it being possible in particular for the housing to be composed of zirconia. However, zirconia is not very transparent to radio waves having frequencies of between 800 MHz and 3 GHz, which may present communication problems, for example if the region in which the device is used is poorly covered by the telecommunication network or exhibits obstacles to waves.

Furthermore, the materials known for their high transparency to radio waves having frequencies of between 800 MHz and 3 GHz may exhibit a limited resistance to impacts and scratches, which renders them unsuitable if the housing is exposed to the external environment, for example if the housing is a casing of a telephone or a portable computer. This is because, in these applications, the device has to reclaim its integrity and its appearance in the event of impact or of frictional actions.

There thus exists a need for a device for communication by radio waves having frequencies of between 800 MHz and 3 GHz which comprises a housing exhibiting both a high transparency to said waves and a high resistance to impacts and scratches.

One aim of the invention is to meet, at least partially, this need.

SUMMARY OF THE INVENTION

According to the invention, this aim is achieved by means of a device for communication by radio waves having frequencies of between 800 MHz and 3 GHz comprising a ceramic housing exposed, at least in part, to the external environment of the device and through which at least a portion of said waves passes during the use of the device, this housing being at least partially composed of a sintered product exhibiting a chemical composition such that, as percentage by weight and for a total of 100%:
- $32\% \leq ZrO_2 \leq 95\%$,
- $1\% < Y_2O_3 + CeO_2 + Sc_2O_3 + MgO + CaO$,
- $0\% \leq CeO_2 \leq 26\%$,
- $0\% \leq MgO \leq 43\%$,
- $0\% \leq CaO \leq 37\%$,
- $0\% \leq SiO_2 \leq 41\%$,
- $0\% \leq Al_2O_3 \leq 55\%$,
- $0\% \leq TiO_2 \leq 30\%$,
- $0\% \leq$ lanthanide oxides, except for $CeO_2 \leq 50\%$,
- $0\% \leq SrO \leq 24\%$,
- $0\% \leq$ SiAlON compounds $\leq 50\%$,
- other compounds $\leq 15\%$, and
- said sintered product comprising, as percentage by weight on the basis of the sintered product and for a total of 100%:
  - more than 50% of a crystalline part, said crystalline part comprising, as percentage by weight on the basis of the crystalline part and for a total of 100%:
    - more than 40% of a first crystalline phase composed of zirconia, more than 50% by weight of said zirconia being stabilized by means of a stabilizer in a quadratic and/or cubic form, the remainder being in a monoclinic form,
    - optionally, less than 50% of a second crystalline phase composed of a compound chosen from $MgAl_2O_4$, $XAl_mO_n$, with X chosen from Mg, Ca, Sr, Y, lanthanide oxides and their mixtures, m being an integer such that $10 \leq m \leq 12$ and n being an integer such that $16 \leq n \leq 20$, $Mg_3Al_2(SiO_4)_3$, $ZrSiO_4$, yttrium silicates, it being possible for the yttrium to be partially replaced, $X_2ZSi_2O_7$, with X chosen from Y, lanthanide oxides and their mixtures and Z chosen from Mg, Al and their mixtures, $Mg_2Al_3(Si_5AlO_{18})$, $(Ca,Sr)Al_2Si_2O_8$, $3(Al_2O_3)_2(SiO_2)$, SiAlON phases, and their mixtures, and
    - optionally less than 10% of a third crystalline phase composed of a compound chosen from oxides of perovskite structure, oxides of spinel structure, oxides of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and their mixtures, oxides of hematite structure $E_2O_3$, the element E being chosen from the group $G_E(1)$ formed by mixtures of aluminum and chromium, mixtures of aluminum and manganese, and their mixtures, orthosilicates chosen from the group of zirconium and praseodymium orthosilicates $(Zr,Pr)SiO_4$, zirconium and vanadium orthosilicates $(Zr,V)SiO_4$, zirconium orthosilicates in which iron oxide is found in inclusion, and their mixtures,
    - less than 5%, preferably less than 3%, preferably less than 1%, of other crystalline phases,
  - optionally an amorphous part comprising, as percentage by weight on the basis of the amorphous part and for a total of 100%:
    - a first vitreous amorphous phase having the composition $X_xAl_aSi_bO_c$ with X chosen from Mg, Ca, Sr, Sc, Y, lanthanide oxides, Ti, Zr, Fe, Mn, Co, Cr and their mixtures, x, a, b and c being integers such that $x+a>0$, $c>0$, $b>0$, $a/b \leq 2$ and $x/b \leq 1$,
    - less than 10%, indeed even less than 5%, indeed even less than 3%, indeed even less than 1%, of other amorphous phases,
- the sum of the contents by weight of second crystalline phase and of first amorphous phase being greater than 10%, preferably greater than 15%, and less than 50%, preferably less than 40%, preferably less than 30%, preferably less than 25%.

Such a sintered product is referred to hereinbelow as "sintered product according to the invention". Such a housing is referred to hereinbelow as "housing according to the invention".

Preferably, a device according to the invention also comprises one and preferably several of the following optional characteristics:

Preferably, the density of the sintered product according to the invention is greater than 90%, indeed even greater than 95%, indeed even greater than 98%, preferably greater than 99%, preferably greater than 99.5%, of the theoretical density. This is because the inventors have discovered that a high density advantageously results in a good development of the color in the sintered part and in good mechanical properties.

Preferably, the mean size of the zirconia grains is less than 10 μm, preferably less than 5 μm, preferably less than 1 μm, preferably less than 0.7 μm, indeed even less than 0.5 μm, further indeed even less than 0.3 μm. The mechanical performances are advantageously improved thereby.

Preferably, the mean size of the grains of the second crystalline phase is less than 50 μm, preferably less than 10 μm, preferably less than 5 μm, indeed even less than 1 μm, further indeed even less than 0.5 μm.

Preferably, the mean size of the grains of the third crystalline phase is less than 1 μm, preferably less than 0.7 μm, indeed even less than 0.5 μm, further indeed even less than 0.3 μm.

In one embodiment, the oxides represent more than 98%, more than 99%, indeed even substantially 100%, of the weight of the sintered product according to the invention.

The zirconia content of the sintered product according to the invention is preferably greater than 40%, preferably greater than 48%, preferably greater than 52%, preferably greater than 60%, preferably greater than 65%, and/or less than 93%, preferably less than 83%.

In one embodiment, the $Y_2O_3+CeO_2+Sc_2O_3+MgO+CaO$ content is less than 18% and the CaO+MgO content is less than 5%.

In one embodiment, the $Y_2O_3+Sc_2O_3$ content is less than 7.5%, preferably less than 7%, and the $CeO_2+MgO+CaO$ content is less than 2%, preferably less than 1%, preferably less than 0.5%.

In one embodiment, the $3.Y_2O_3+CeO_2$ content is greater than 4%, preferably greater than 5%, preferably greater than 6%, and less than 18%, and the $Sc_2O_3+MgO+CaO$ content is less than 2%, preferably less than 1%, preferably less than 0.5%.

In one embodiment, the $Y_2O_3$ content is greater than 1%, preferably greater than 2%, and less than 8%, preferably less than 7%, and the $CeO_2+Sc_2O_3+MgO+CaO$ content is less than 2%, preferably less than 1%, preferably less than 0.5%.

In one embodiment, the $CeO_2$ content is greater than 4%, preferably greater than 5%, preferably greater than 6%, and less than 14%, preferably less than 13%, and the $Y_2O_3+Sc_2O_3+MgO+CaO$ content is less than 2%, preferably less than 1%, preferably less than 0.5%.

In one embodiment, the MgO content is greater than 0.7% and less than 34%, indeed even less than 26%, indeed even less than 17%.

In one embodiment, the $Al_2O_3$ content is greater than 2.5% and less than 46%.

In one embodiment, the $La_2O_3$ content is greater than 3.5% and less than 28%, indeed even less than 20%.

In one embodiment, the $SiO_2$ content is greater than 2.5% and less than 34%.

In one embodiment, the CaO content is greater than 2% and less than 20%, indeed even less than 13%.

In one embodiment, the SrO content is greater than 3% and less than 16%.

In one embodiment, the $Y_2O_3$ content is greater than 6.5% and less than 37%, indeed even less than 33%.

In one embodiment, the $Sc_2O_3$ content is greater than 5% and less than 31%, indeed even less than 27%.

In one embodiment, the content of SiAlON phases is less than 40%, indeed even less than 30%, indeed even less than 20%, indeed even less than 10%, indeed substantially zero.

Preferably, the SiAlON phases are chosen from $Si_3N_4$, AlN, AlON, $Si_2ON_2$ and their mixtures.

In one embodiment, in particular when the sintered product is manufactured according to a process according to the invention (that is to say, a process comprising stages a) to c) and optionally one or more stages d) to f) described below) in which the particulate mixture comprises a second particulate fraction of $MgAl_{12}O_{19}$, the sintered product according to the invention exhibits, as percentage by weight on the basis of the weight of the product and for a total of 100%:

a MgO content of greater than 0.7%, preferably of greater than 1%, and preferably of less than 13%, preferably of less than 4%, preferably of less than 3%, preferably of less than 2%, and an $Al_2O_3$ content of greater than 9%, preferably of greater than 14%, and preferably of less than 55%, preferably of less than 46.5%, preferably of less than 37.5%, preferably of less than 28%, preferably of less than 23.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 31%, preferably of less than 22%, preferably of less than 18%, and a CaO+MgO content of less than 18%, preferably of less than 9%, preferably less than 5%, and an $Sc_2O_3$ content preferably of less than 3%, preferably of less than 1%, and a content of other compounds, that is to say of the compounds other than those mentioned above (MgO, $Al_2O_3$, $ZrO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $MgAl_{12}O_{19}$ content preferably being greater than 10%, preferably greater than 15%, and less than 50%, preferably less than 40%, preferably less than 30%, preferably less than 25%, as percentage by weight on the basis of the crystalline part, and the content of first crystalline phase, the stabilizer preferably being chosen from $Y_2O_3$, $CeO_2$ and their mixtures, preferably being greater than 40%, preferably greater than 50%, preferably greater than 60%, preferably greater than 75%, and preferably less than 90%, and indeed even less than 85%, as percentage by weight on the basis of the crystalline part, and the crystalline part preferably representing more than 60%, preferably more than 70%, preferably more than 80%, indeed even more than 90%, indeed even more than 95%, of the sintered product, as percentage by weight on the basis of the sintered product.

In one embodiment, in particular when the sintered product is manufactured according to a process according to the invention in which the particulate mixture comprises a second particulate fraction of $LaAl_{11}O_{18}$, the sintered product according to the invention exhibits, as percentage by weight on the basis of the weight of the product and for a total of 100%:

an $La_2O_3$ content of greater than 2%, preferably of greater than 3%, and preferably of less than 20%, preferably of less than 11.5%, preferably of less than 9%, preferably of less than 7%, preferably of less than 6%, and an $Al_2O_3$ content of greater than 7%, preferably of greater than 11.5%, and preferably of less than 48%, preferably of less than 39%, preferably of less than 31%, preferably of less than 23.5%, preferably of less than 19.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 18% and a CaO+MgO content of less than 5%, indeed even of less than 3%, indeed even of less than 1%, and an $Sc_2O_3$ content preferably of less than 3%, preferably of less than 1%, and a content of other compounds, that is to say of the compounds other than those mentioned above ($La_2O_3$, $Al_2O_3$, $ZrO_2$, $Y_2O_3$, $CeO_2$, $Sc_2O_3$, CaO, MgO), preferably of the oxides, of less than 10%, indeed even of less than 8%, indeed even of less than 5%, indeed even of less than 3%, indeed even of less than 2%, indeed even of less than 1%, indeed even of less than 0.5%, the $LaAl_{11}O_{18}$ content preferably being greater than 10%, preferably greater than 15%, and less than 50%, preferably less than 40%, preferably less than 30%, preferably less than 25%, as percentage by weight on the basis of the crystalline part, and the content of first crystalline phase (the stabilizer preferably being chosen from $Y_2O_3$, $CeO_2$ and their mixtures) preferably being greater than 40%, preferably greater than 50%, preferably greater than 60%, preferably greater than 75%, and preferably less than 90%, indeed even less than 85%, as percentage by weight on the basis of the crystalline part, and the crystalline part preferably representing more than 60%, preferably more than 70%, preferably more than 80%, indeed even more than 90%, indeed even more than 95%, of the sintered product, as percentage by weight on the basis of the sintered product.

In one embodiment, in particular when the sintered product is manufactured according to a process according to the invention in which the particulate mixture comprises a second particulate fraction of $Mg_3Al_2(SiO_4)_3$, the sintered product according to the invention exhibits:

a MgO content of greater than 3%, preferably of greater than 4.5%, and preferably of less than 24%, preferably of less than 15%, preferably of less than 12%, preferably of less than 9%, preferably of less than 7.5%, and an $Al_2O_3$ content of greater than 2.5%, preferably of greater than 3.5%, and preferably of less than 21%, preferably of less than 12.5%, preferably of less than 10%, preferably of less than 7.5%, preferably of less than 6.5%, and a $SiO_2$ content of greater than 4.5%, preferably of greater than 6.5%, and preferably of less than 31%, preferably of less than 22.5%, preferably of less than 18%, preferably of less than 13.5%, preferably of less than 11.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 42%, preferably of less than 33%, preferably of less than 18%, and a CaO+MgO content of less than 29%, preferably of less than 20%, and a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $Mg_3Al_2(SiO_4)_3$ content preferably being greater than 3%, preferably greater than 5%, and less than 44%, preferably less than 35%, preferably less than 26%, preferably less than 21%, as percentage by weight on the basis of the crystalline part, and the content of first crystalline phase preferably being greater than 40%, preferably greater than 50%, preferably greater than 56%, indeed even greater than 65%, indeed even greater than 74%, indeed even greater than 79%, and preferably less than 97%, indeed even less than 95%, as percentage by weight on the basis of the crystalline part, and the crystalline part preferably representing more than 62%, indeed even more than 68%, indeed even more than 75%, indeed even more than 78%, and preferably less than 93%, indeed even less than 92%, indeed even less than 90%, of the sintered product, as percentage by weight on the basis of the sintered product, and the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $ZrSiO_4$, the sintered product according to the invention exhibits:

a $SiO_2$ content of greater than 3%, preferably of greater than 5%, and preferably of less than 26%, preferably of less than 17%, preferably of less than 14%, preferably of less than 10.5%, preferably of less than 8.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 18% and a CaO+MgO content of less than 5%, indeed even of less than 3%, indeed even of less than 1%, and an $Sc_2O_3$ content preferably of less than 3%, preferably of less than 1%, and a content of other compounds, that is to say of the compounds other than those mentioned above (MgO, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $ZrSiO_4$ content preferably being greater than 8%, preferably greater than 12%, and less than 50%, preferably less than 40%, preferably less than 30%, preferably less than 25%, as percentage by weight on the basis of the crystalline part, and the content of first crystalline phase (the stabilizer preferably being chosen from $Y_2O_3$, $CeO_2$ and their mixtures) preferably being greater than 40%, preferably greater than 50%, indeed even greater than 60%, indeed even greater than 70%, indeed even greater than 75%, and preferably less than 92%, indeed even less than 88%, as percentage by weight on the basis of crystalline part, and the crystalline part preferably representing more than 70%, indeed even more than 80%, indeed even more than 85%, and preferably less than 95%, indeed even less than 93%, of the sintered product, as percentage by weight on the basis of the sintered product, and the amorphous part comprising more than 90% of a vitreous amorphous phase having the composition $X_xAl_aSi_bO_c$, with X chosen from Mg, Ca, Sr, Sc, Y, lanthanide oxides, Ti, Zr, Fe, Mn, Co, Cr and their mixtures, x, a, b and c being integers such that $x+a>0$, $c>0$, $b>0$, $a/b\leq 2$ and $x/b\leq 1$, as percentage by weight on the basis of the amorphous part.

In one embodiment, in particular when the sintered product is manufactured according to a process according to the invention in which the particulate mixture comprises a second particulate fraction of $Ca_2Al_3(SiO_4)(Si_2O_7)$OOH, the sintered product according to the invention exhibits:

an $Al_2O_3$ content of greater than 3.5%, preferably of greater than 5%, and preferably of less than 26%, preferably of less than 17.5%, preferably of less than 14%, preferably of less than 10.5%, preferably of less than 9%, and a $SiO_2$ content of greater than 4%, preferably of greater than 6%, and preferably of less than 29%, preferably of less than 20%, preferably of less than 16%, preferably of less than 12%, preferably of less than 10%, and a CaO content of greater than 2.5%, preferably of greater than 3.5%, and preferably of less than 21%, preferably of less than 12.5%, preferably of less than 10%, preferably of less than 7.5%, preferably of less than 6.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 39%, preferably of less than 30.5%, preferably of less than 18%, and a CaO+MgO content of less than 26%, preferably of less than 17.5%, preferably of less than 7.5%, and a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, and the content of first crystalline phase preferably being greater than 80%, indeed even greater than 90%, indeed even greater than 95%, as percentage by weight on the basis of the crystalline part, and the crystalline part preferably representing more than 57%, indeed even more than 67%, indeed even more than 71%, and preferably less than 86%, indeed even less than 81%, of the sintered product, as percentage by weight on the basis of the sintered product, and the amorphous part comprising more than 90% of a vitreous amorphous phase having the composition $X_xAl_aSi_bO_c$, with X chosen from Ca and optionally Mg, Sr, Sc, Y, lanthanide oxides, Ti, Zr, Fe, Mn, Co, Cr and their mixtures, x, a, b and c being integers such that $x>0$, $a>0$, $c>0$, $b>0$, $a/b\leq 2$ and $x/b\leq 1$, as percentage by weight on the basis of the amorphous part.

In one embodiment, in particular when the sintered product is manufactured according to a process according to the invention in which the particulate mixture comprises a second particulate fraction of $Y_2Si_2O_7$, the sintered product according to the invention exhibits:

an $SiO_2$ content of greater than 3.5%, preferably of greater than 5%, and preferably of less than 26%, preferably of less than 17.5%, preferably of less than 14%, preferably of less than 10.5%, preferably of less than 9%, and a $Y_2O_3$ content of greater than 6.5%, preferably of greater than 9.5%, and preferably of less than 38%, preferably of less than 32.5%, preferably of less than 26%, preferably of less than 19.5%, preferably of less than 16.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 56%, preferably of less than 50.5%, preferably of less than 18%, and a CaO+MgO content of less than 26%, preferably of less than 17.5%, preferably of less than 5%, indeed even of less than 3%, indeed even of less than 1%, and an $Sc_2O_3$ content preferably of less than 3%, preferably of less than 1%, and a content of other compounds, that is to say of the compounds other than those mentioned above (MgO, $ZrO_2$, $SiO_2$, $Y_2O_3$, $CeO_2$, $Sc_2O_3$, CaO), preferably of the oxides, of less than 10%, indeed even of less than 8%, indeed of less than 5%, indeed even of less than 3%, indeed even of less than 2%, indeed even of less than 1%, indeed even of less than 0.5%, and the $Y_2Si_2O_7$ content preferably being greater than 5%, indeed even greater than 8%, and less than 33%, indeed even less than 25%, indeed even less than 18%, indeed even less than 14%, as percentage by weight on the basis of the crystalline part, and the content of first crystalline phase (the stabilizer preferably being chosen from $Y_2O_3$, $CeO_2$ and their mixtures) preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Y and optionally Mg, Ca, Sr, Sc, lanthanide oxides, Ti, Zr, Fe, Mn, Co, Cr and their mixtures, x, a, b and c being integers such that x>0, x+a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $Sc_2Si_2O_7$, the sintered product according to the invention exhibits:

- a $SiO_2$ content of greater than 4.5%, preferably of greater than 7%, and preferably of less than 32%, preferably of less than 23%, preferably of less than 18.4%, preferably of less than 14%, preferably of less than 11.5%, and
- an $Sc_2O_3$ content of greater than 5%, preferably of greater than 8%, and preferably of less than 36%, preferably of less than 27%, preferably of less than 22%, preferably of less than 16%, preferably of less than 13.5%, and
- a zirconia content preferably of greater than 40%, preferably of greater than 48%, preferably of greater than 52%, preferably of greater than 60%, preferably of greater than 65%, and/or of less than 93%, preferably of less than 83%, and
- a $Y_2O_3+CeO_2+Sc_2O_3+MgO+CaO$ sum of less than 54%, preferably of less than 45%, preferably of less than 18%, and a CaO+MgO content of less than 5%, and
- a content of other compounds, that is to say of the compounds other than those mentioned above (MgO, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $Sc_2Si_2O_7$ content preferably being greater than 5%, indeed even greater than 8%, and less than 33%, indeed even less than 25%, indeed even less than 18%, indeed even less than 14%, as percentage by weight on the basis of crystalline part, and the content of first crystalline phase preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Sc and optionally Mg, Ca, Sr, Sc, lanthanide oxides, Ti, Zr, Fe, Mn, Co, Cr and their mixtures, x, a, b and c being integers such that x>0, x+a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $Mg_2Al_3(Si_5AlO_{18})$, the sintered product according to the invention exhibits:

- a MgO content of greater than 1.5%, preferably of greater than 2%, and preferably of less than 16.5%, preferably of less than 7.5%, preferably of less than 6%, preferably of less than 4.5%, preferably of less than 3.5%, and
- an $Al_2O_3$ content of greater than 2.5%, preferably of greater than 4%, and preferably of less than 23%, preferably of less than 14.5%, preferably of less than 11.5%, preferably of less than 9%, preferably of less than 7.5%, and
- a $SiO_2$ content of greater than 5.5%, preferably of greater than 8%, and preferably of less than 37%, preferably of less than 28%, preferably of less than 22.5%, preferably of less than 17%, preferably of less than 14%, and
- a zirconia content preferably of greater than 40%, preferably of greater than 48%, preferably of greater than 52%, preferably of greater than 60%, preferably of greater than 65%, and/or of less than 93%, preferably of less than 83%, and
- a $Y_2O_3+CeO_2+Sc_2O_3+MgO+CaO$ sum of less than 34.5%, preferably of less than 25.5%, preferably of less than 18%, and a CaO+MgO content of less than 21.5%, preferably of less than 12.5%, preferably of less than 5%, and
- a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably the oxides, of less than 10%, indeed even of less than 8%, indeed even of less than 5%, indeed even of less than 3%, indeed even of less than 2%, indeed even of less than 1%, indeed even of less than 0.5%, the $Mg_2Al_3(Si_5AlO_{18})$ content preferably being greater than 5%, indeed even greater than 8%, and less than 33%, indeed even less than 25%, indeed even less than 18%, indeed even less than 14%, as percentage by weight on the basis of the crystalline part, and the content of first crystalline phase preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $Mg_3Si_4O_{10}(OH)_2$, the sintered product according to the invention exhibits:

- a MgO content of greater than 3%, preferably of greater than 4.5%, and preferably of less than 25%, preferably of less than 16.5%, preferably of less than 13.5%, preferably of less than 10%, preferably of less than 8.5%, and
- a $SiO_2$ content of greater than 6.5%, preferably of greater than 10%, and preferably of less than 42%, preferably of less than 33.5%, preferably of less than 27%, preferably of less than 20%, preferably of less than 17%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 43%, preferably of less than 34.5%, preferably of less than 18%, and a CaO+MgO content of less than 30%, preferably of less than 21.5%, preferably of less than 9%, and a content of other compounds, that is to say of the compounds other than those mentioned above (MgO, $ZrO_2$, $SiO_2$, $Y_2O_3$, $CeO_2$, $Sc_2O_3$, CaO), preferably the oxides, of less than 10%, indeed even of less than 8%, indeed even of less than 5%, indeed even of less than 3%, indeed even of less than 2%, indeed even of less than 1%, indeed even of less than 0.5%, the content of first crystalline phase preferably being greater than 80%, indeed even greater than 90%, indeed even greater than 95%, as percentage by weight on the basis of the crystalline part, and the crystalline part preferably representing more than 57%, indeed even more than 67%, indeed even more than 71%, and preferably less than 86%, indeed even less than 81%, of the sintered product, as percentage by weight on the basis of the sintered product, and the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a+x>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $CaAl_2Si_2O_8$, the sintered product according to the invention exhibits:

an $Al_2O_3$ content of greater than 3.5%, preferably of greater than 5.5%, and preferably of less than 27%, preferably of less than 18.5%, preferably of less than 15%, preferably of less than 11.5%, preferably of less than 9.5%, and a CaO content of greater than 2%, preferably of greater than 3%, and preferably of less than 19%, preferably of less than 10%, preferably of less than 8%, preferably of less than 6%, preferably of less than 5%, and a $SiO_2$ content of greater than 4%, preferably greater than 6.5%, and preferably of less than 30%, preferably of less than 21.5%, preferably of less than 17.5%, preferably of less than 13%, preferably of less than 11%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 37%, preferably of less than 28%, preferably of less than 18%, and a CaO+MgO content of less than 24%, preferably of less than 15%, preferably of less than 5%, and a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably the oxides, of less than 10%, indeed even of less than 8%, indeed even of less than 5%, indeed even of less than 3%, indeed even of less than 2%, indeed even of less than 1%, indeed even of less than 0.5%, the content of first crystalline phase preferably being greater than 80%, indeed even greater than 90%, indeed even greater than 95%, as percentage by weight on the basis of the crystalline part, and the crystalline part preferably representing more than 57%, indeed even more than 67%, indeed even more than 71%, and preferably less than 86%, indeed even less than 81%, of the sintered product, as percentage by weight on the basis of the sintered product, and the amorphous part comprising more than 90% of a vitreous amorphous phase having the composition $X_xAl_aSi_bO_c$, with X chosen from Ca and optionally Mg, Sr, Sc, Y, lanthanide oxides, Ti, Zr, Fe, Mn, Co, Cr and their mixtures, x, a, b and c being integers such that x>0, a>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of $SrAl_2Si_2O_8$, the sintered product according to the invention exhibits:

an $Al_2O_3$ content of greater than 3%, preferably of greater than 4.5%, and preferably of less than 24%, preferably of less than 15.5%, preferably of less than 12.5%, preferably of less than 9.5%, preferably of less than 8%, and an SrO content of greater than 3%, preferably of greater than 4.5%, and preferably of less than 25%, preferably of less than 16%, preferably of less than 13%, preferably of less than 10%, preferably of less than 8%, and a $SiO_2$ content of greater than 3.5%, preferably of greater than 5.5%, and preferably of less than 27%, preferably of less than 18.5%, preferably of less than 15%, preferably of less than 11%, preferably of less than 9.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 18% and a CaO+MgO content of less than 5%, indeed even of less than 3%, indeed even of less than 1%, and an $Sc_2O_3$ content preferably of less than 3%, preferably of less than 1%, and an $Sc_2O_3$ content preferably of less than 3%, preferably of less than 1%, and a content of other compounds, that is to say of the compounds other than those mentioned above (MgO, $Al_2O_3$, SrO, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $(Sr, Ca)Al_2Si_2O_8$ content preferably being greater than 5%, indeed even greater than 8%, and less than 33%, indeed even less than 25%, indeed even less than 18%, indeed even less than 14%, as percentage by weight on the basis of the crystalline part, and the content of first crystalline phase (the stabilizer preferably being chosen from $Y_2O_3$, $CeO_2$ and their mixtures)

preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Sr and/or Ca and optionally Mg, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of mullite, the sintered product according to the invention exhibits:

an $Al_2O_3$ content of greater than 7%, preferably of greater than 10.5%, and preferably of less than 45%, preferably of less than 36%, preferably of less than 29%, preferably of less than 22%, preferably of less than 18%, and a $SiO_2$ content of greater than 2.5%, preferably of greater than 4%, and preferably of less than 23%, preferably of less than 14%, preferably of less than 11.5%, preferably of less than 8.5%, preferably of less than 7%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 18% and a CaO+MgO content of less than 5%, indeed even of less than 3%, indeed even of less than 1%, and an $Sc_2O_3$ content preferably of less than 3%, preferably of less than 1%, and a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably the oxides, of less than 10%, indeed even of less than 8%, indeed even of less than 5%, indeed even of less than 3%, indeed even of less than 2%, indeed even of less than 1%, indeed even of less than 0.5%, the $3(Al_2O_3)_2(SiO_2)$ content preferably being greater than 5%, indeed even greater than 8%, and less than 33%, indeed even less than 25%, indeed even less than 18%, indeed even less than 14%, as percentage by weight on the basis of the crystalline part, and the content of first crystalline phase (the stabilizer preferably being chosen from $Y_2O_3$, $CeO_2$ and their mixtures) preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Sr, Ca, Mg, Sc, Y, lanthanide oxides, Ti, Zr, Fe, Mn, Co, Cr and their mixtures, x, a, b and c being integers such that a>0, a+x>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of kaolinite, the sintered product according to the invention exhibits:

an $Al_2O_3$ content of greater than 4.5%, preferably of greater than 7%, and preferably of less than 32%, preferably of less than 23%, preferably of less than 18.5%, preferably of less than 14%, preferably of less than 11.5%, and a $SiO_2$ content of greater than 5%, preferably of greater than 8%, and preferably of less than 36%, preferably of less than 27%, preferably of less than 22%, preferably of less than 16.5%, preferably of less than 13.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 18% and a CaO+MgO content of less than 5%, and a content of other compounds, that is to say of the compounds other than those mentioned above (MgO, $Al_2O_3$, $ZrO_2$, $SiO_2$, $Y_2O_3$, $CeO_2$, $Sc_2O_3$, CaO), preferably of the oxides, of less than 10%, indeed even of less than 8%, indeed even of less than 5%, indeed even of less than 3%, indeed even of less than 2%, indeed even of less than 1%, indeed even of less than 0.5%, the $Al_2O_3SiO_2$ content preferably being greater than 5%, indeed even greater than 8%, and less than 33%, indeed even less than 25%, indeed even less than 18%, indeed even less than 14%, as percentage by weight on the basis of the crystalline part, and the content of first crystalline phase preferably being greater than 40%, preferably greater than 50%, preferably greater than 60%, preferably greater than 67%, indeed even greater than 75%, indeed even greater than 82%, and less than 95%, indeed even less than 92%, as percentage by weight on the basis of the crystalline part, and the crystalline part preferably representing more than 57%, indeed even more than 67%, indeed even more than 71%, and preferably less than 90%, indeed even less than 88%, indeed even less than 83%, of the sintered product, as percentage by weight on the basis of the sintered product, and the amorphous part comprising more than 90% of a vitreous amorphous phase having the composition $X_xAl_aSi_bO_c$, with X chosen from Sr, Ca, Mg, Sc, Y, lanthanide oxides, Ti, Zr, Fe, Mn, Co, Cr and their mixtures, x, a, b and c being integers such that a>0, c>0, b>0, a/b≤2 and x/b≤1, as percentage by weight on the basis of the amorphous part.

In one embodiment, in particular when the sintered product is manufactured according to a process according to the invention in which the particulate mixture comprises a second particulate fraction of montmorillonite, the sintered product according to the invention exhibits:

an Al₂O₃ content of greater than 2.5%, preferably of greater than 4%, and preferably of less than 21%, preferably of less than 13.5%, preferably of less than 11%, preferably of less than 8%, preferably of less than 7%, and a SiO₂ content of greater than 6%, preferably of greater than 9.5%, and preferably of less than 40%, preferably of less than 31.5%, preferably of less than 25%, preferably of less than 19%, preferably of less than 16%, and a MgO content of greater than 1%, preferably of greater than 1.5%, and preferably of less than 14%, preferably of less than 5%, preferably of less than 4%, preferably of less than 3%, preferably of less than 2.5%, and a zirconia content preferably of greater than 40%, preferably of greater than 48%, preferably of greater than 52%, preferably of greater than 60%, preferably of greater than 65%, and/or of less than 93%, preferably of less than 83%, and a $Y_2O_3+CeO_2+Sc_2O_3+MgO+CaO$ sum of less than 32%, preferably of less than 23%, preferably of less than 18%, and a CaO+MgO content of less than 19%, preferably of less than 10%, preferably of less than 5%, and a content of other compounds, that is to say of the compounds other than those mentioned above (MgO, Al₂O₃, ZrO₂, SiO₂, Y₂O₃, CeO₂, Sc₂O₃, CaO), preferably of the oxides, of less than 10%, indeed even of less than 8%, indeed even of less than 5%, indeed even of less than 3%, indeed even of less than 2%, indeed even of less than 1%, indeed even of less than 0.5%, and the content of first crystalline phase preferably being greater than 80%, indeed even greater than 90%, indeed even greater than 95%, as percentage by weight on the basis of the crystalline part, and the crystalline part preferably representing more than 57%, indeed even more than 67%, indeed even more than 71%, and preferably less than 86%, indeed even less than 81%, of the sintered product, as percentage by weight on the basis of the sintered product, and the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0 <Mg and Al in vitreous phase necessarily>, a>0, c>0, b>0, a/b≤2 and x/b≤1, as percentage by weight on the basis of the amorphous part.

Preferably, the sintered product exhibits a crystalline part comprising more than 50%, preferably more than 60%, indeed even more than 70%, and/or less than 85%, as percentage by weight on the basis of the crystalline part, of a crystalline phase composed of zirconia, preferably more than 80%, preferably more than 90%, preferably more than 95%, preferably more than 99%, of said zirconia being stabilized by means of a stabilizer in a quadratic and/or cubic form, the remainder being in a monoclinic form.

In one embodiment, the sintered product exhibits a crystalline part comprising more than 15% and less than 40%, preferably less than 30%, preferably less than 25%, as percentage by weight on the basis of the crystalline part, of a second crystalline phase composed of a compound chosen from $MgAl_2O_4$, $XAl_mO_n$, with X chosen from Mg, Ca, Sr, Y, lanthanide oxides and their mixtures, m being an integer such that 10≤m≤12, and n being an integer such that 16≤n≤20, $Mg_3Al_2(SiO_4)_3$, $ZrSiO_4$, yttrium silicates, it being possible for the yttrium to be partially replaced, $X_2ZSi_2O_7$, with X chosen from La, Y, lanthanide oxides and their mixtures and Z chosen from Mg, Al and their mixtures, $Mg_2Al_3(Si_5Al_{18})$, $(Ca,Sr)Al_2Si_2O_8$, $3(Al_2O_3)_2(SiO_2)$, SiAlON phases, and their mixtures.

The invention also relates to a process comprising the following stages:
a) preparation of a starting charge by way of a particulate mixture,
b) forming a preform from said starting charge,
c) sintering said preform, such as to obtain a sintered part,
d) optionally, polishing said sintered part, preferably until the surface roughness Ra is less than 0.05 μm, preferably less than 0.02 μm, more preferably less than 0.01 μm,
e) optionally, confirmation of the color of the sintered part, in particular by measurement of the L* and/or a* and/or b* parameters,
f) optionally, assembling the sintered part so that it constitutes a housing of a communication device according to the invention.

According to the invention, the particulate mixture comprises, as percentage by weight and for a total of 100%:
between 40% and 88% of a first particulate fraction composed of zirconia ZrO₂ particles and comprising a compound capable of stabilizing the zirconia, said compound capable of stabilizing the zirconia stabilizing or not stabilizing said zirconia and being chosen from Y₂O₃, Sc₂O₃, MgO, CaO, CeO₂ and their mixtures, and present in an amount of greater than 2.0% and less than 20.0%, calculated on the basis of the sum of ZrO₂, Y₂O₃, Sc₂O₃, MgO, CaO and CeO₂, the MgO+CaO content being less than 5.0% on the basis of the sum of ZrO₂, Y₂O₃, Sc₂O₃, MgO, CaO and CeO₂, it being possible for the compound capable of stabilizing the zirconia to be replaced by an equivalent amount of precursor(s) of this compound,
between 10% and 50% of a second particulate fraction composed of $MgAl_2O_4$ particles and/or of particles made of a compound of formula $XAl_mO_n$, with X chosen from Mg, Ca, Sr, Y, lanthanide oxides and their mixtures, m being an integer such that 10≤m≤12 and n being an integer such that 16≤n≤20, and/or of particles made of a compound of formula $X_xAl_aSi_bO_c(OH)_y(H_2O)_z$, with X chosen from Mg, Ca, Sr, Sc, Y, lanthanide oxides, Ti, Zr, Fe, Mn, Co, Cr and their mixtures, x, a, b, c, y and z being integers such that x+a>0, c>0, b>0, a/b≤2, x/b≤1, y 3(a+x) and z b, and/or of particles of SiAlON phase(s) and/or of mullite particles and/or of particles made of a mixture of these compounds,
less than 10% of a third particulate fraction composed of particles made of an oxide of perovskite structure, optionally replaced, totally or partially, by an equivalent amount of precursor(s) of this oxide, and/or of particles made of an oxide of spinel structure and/or of particles made of an oxide of rutile structure FO₂, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and their mixtures, and/or of particles made of an oxide of hematite structure E₂O₃, the element E being chosen from the group $G_E(1)$ formed by mixtures of aluminum and chromium, mixtures of aluminum and manganese, and their mixtures, and/or of particles made of a compound chosen from the group of the zirconium and praseodymium orthosilicates $(Zr,Pr)SiO_4$, zirconium and vanadium orthosilicates $(Zr,V)SiO_4$, zirconium orthosilicates in which iron oxide is found in inclusion, and their mixtures, and/or of particles made of a mixture of these compounds, less than 2%, preferably less than 1%, of a fourth particulate fraction composed of other particles.

Such a particulate mixture is referred to hereinbelow as "particulate mixture according to the invention".

A particulate mixture according to the invention makes it possible to manufacture a sintered part made of a sintered product according to the invention.

In a preferred embodiment, the housing of a device according to the invention is manufactured according to a process according to the invention.

Preferably, a process according to the invention also comprises one and preferably several of the following optional characteristics:

preferably, the particulate mixture exhibits a specific surface, calculated by the BET method, of greater than 3 $m^2/g$, preferably of greater than 5 $m^2/g$, and/or of less than 30 $m^2/g$.

Preferably, the first particulate fraction represents more than 70% and/or less than 85% of the particulate mixture, as percentage by weight.

Preferably, the median size of the particles of the first particulate fraction is between 100 nm and 1000 nm.

Preferably, the second particulate fraction represents more than 15% and/or less than 40% of the particulate mixture, as percentage by weight.

Preferably, the median size of the particles of the second particulate fraction is between 100 nm and 10 000 nm, preferably less than 5000 nm.

Preferably, more than 25% by weight of the particles of the second particulate fraction exhibit a length/width ratio of greater than 3.

Preferably, the second particulate fraction is composed of $MgAl_2O_4$ particles and/or of particles made of a compound of formula $XAl_mO_n$, with X chosen from Mg, Ca, Sr, Y, lanthanide oxides and their mixtures, m being an integer such that $10 \leq m \leq 12$ and n being an integer such that $16 \leq n \leq 20$, and/or of particles made of a compound of formula $X_xAl_aSi_bO_c(OH)_y(H_2O)_z$, with X chosen from Mg, Ca, Sr, Sc, Y, lanthanide oxides, Ti, Zr, Fe, Mn, Co, Cr and their mixtures, x, a, b, c, y and z being integers such that $x+a>0$, $c>0$, $b>0$, $a/b \leq 2$, $x/b \leq 1$, y 3(a+x) and z b, and/or of $Si_3N_4$ particles and/or of AlN particles and/or of AlON particles and/or of $Si_2ON_2$ particles and/or of particles made of a mixture of these compounds. Preferably, the second particulate fraction is composed of $MgAl_2O_4$ particles and/or of $MgAl_{12}O_{19}$ particles and/or of $LaAl_{11}O_{18}$ particles and/or of particles made of an orthosilicate and/or of particles made of a sorosilicate and/or of particles made of a cyclosilicate and/or of particles made of an inosilicate and/or of particles made of a phyllosilicate and/or of particles made of a tectosilicate and/or of mullite $3(Al_2O_3)_2(SiO_2)$ particles and/or of particles made of a clay and/or of particles made of a mixture of these compounds.

In a preferred embodiment, the second particulate fraction is composed:

of $MgAl_{12}O_{19}$ particles, preferably in the form of particles exhibiting a length/width ratio of greater than 3, indeed even of greater than 5, indeed even of greater than 7, indeed even of greater than 10;

of $LaAl_{11}O_{18}$ particles, preferably in the form of particles exhibiting a length/width ratio of greater than 3, indeed even of greater than 5, indeed even of greater than 7, indeed even of greater than 10;

of garnet $Mg_3Al_2(SiO_4)_3$ particles;

of zircon $ZrSiO_4$ particles;

of epidote $Ca_2Al_3(SiO_4)(Si_2O_7)OOH$ particles;

of particles of an yttrium silicate, such as $Y_2Si_2O_7$, it being possible for the yttrium to be partially replaced by Sc: $(Sc,Y)_2Si_2O_7$;

of melilite $X_2ZSi_2O_7$ particles, with X chosen from Y, lanthanide oxides and their mixtures and Z chosen from Mg, Al and their mixtures;

of cordierite $Mg_2Al_3(Si_5AlO_{18})$ particles;

of particles of an amphibole of formula $(Ca, Al, Mg)_7Si_8O_{22}(OH)_2$;

of talc $Mg_3Si_4O_{10}(OH)_2$ particles;

of particles of a feldspar $(Ca, Sr)Al_2Si_2O_8$;

of mullite $3(Al_2O_3)_2(SiO_2)$ particles;

of kaolinite $Si_2O_5Al_2(OH)_4$ particles;

of montmorillonite $Si_4O_{10}(Al,Mg)_3(OH)_2$ particles;

of vermicullite $(Mg, Ca)(MgAl)_6(Al,Si)_8O_{22}(OH)_4 \cdot 8H_2O$ particles;

or of a mixture of such particles.

Preferably, the median size of the particles of the third particulate fraction is less than 1000 nm, indeed even less than 500 nm.

The fourth particulate fraction preferably represents less than 0.5%, preferably less than 0.2%, preferably less than 0.1%, of the particulate mixture, as percentage by weight. Preferably, the fourth particulate fraction is composed of the impurities.

In a specific embodiment, the oxides represent more than 98%, more than 99%, indeed even substantially 100%, of the weight of the particulate mixture.

In stage c), the preform is sintered, preferably at a temperature of between 1200° C. and 1500° C.

DEFINITIONS

The term "sintering" refers to a consolidation by heat treatment at more than 1100° C. of a particulate agglomerate, with optionally melting, partially or complete, of some of the constituents of this agglomerate (but not of all these constituents).

A perovskite crystallographic structure corresponds to a particular arrangement of elements in sites conventionally referred to as "sites A" and "sites B". The elements positioned on the sites A and B are normally referred to as "elements A" and "elements B" respectively.

Singled out in particular among the compounds exhibiting a perovskite crystallographic structure are "oxides of perovskite structure". These oxides comprise in particular compounds of formula $ABO_3$. All the sites A and/or B are not always occupied by elements A and/or B respectively.

For example, a lanthanum/manganese (LM) oxide of perovskite structure is a compound where A is lanthanum and B is manganese. Its structure is conventionally defined by a formula of $LaMnO_3$ type. Another example may be a lanthanum/cobalt/iron/manganese oxide of perovskite structure where A is lanthanum and B is a mixture of cobalt, iron and manganese defined by a formula of the $LaCo_xFe_yMn_zO_3$ type, with $x+y+z=1$, x, y and z being the molar fractions of the elements cobalt, iron and manganese respectively.

A spinel crystallographic structure corresponds to a particular arrangement of elements C and D in sites conventionally referred to as "octahedral sites" and "tetrahedral sites". The compounds exhibiting a spinel crystallographic structure comprise in particular the compounds of formula $CD_2O_4$ known as "normal spinels", in which the element C occupies a tetrahedral site and the element D occupies an octahedral site, and the compounds of formulae $D(C,D)O_4$, known as "inverse spinels", in which the element D occupies tetrahedral and octahedral sites and the element C occupies an octahedral site.

For example, a cobalt/chromium oxide of normal spinel structure is a compound where is cobalt, positioned on C sites, and D is chromium, positioned on D sites. Its structure is conventionally defined by a formula of the $CoCr_2O_4$ type. Another example of spinel is the inverse spinel $TiFe_2O_4$, where C is titanium positioned on D sites and D is iron positioned on C sites and D sites. Another example may be a cobalt/iron/chromium oxide of spinel structure where C is a mixture of cobalt and iron and D is a mixture of iron and chromium defined by a formula of the $(CO_xFe_y)(Fe_zCr_t)_2O_4$ type, with $x+y=1$ and $z+t=1$, x, y+z and t being the molar fractions of the elements cobalt, iron and chromium respectively, x and y being the molar fractions of the elements present at sites C, and z and t being the molar fractions of the elements present at sites D.

A hematite crystallographic structure corresponds to a particular arrangement of elements in sites conventionally referred to as "sites E". The elements positioned on the sites E are normally referred to as "elements E".

Singled out in particular among the compounds exhibiting a hematite crystallographic structure are "oxides of hematite structure". These oxides comprise in particular compounds of formula $E_2O_3$.

For example, a manganese/aluminum oxide of hematite structure is a compound where E is a mixture of manganese and aluminum. Its structure is conventionally defined by a formula of the $(Mn_xAl_y)_2O_3$ type, with $x+y=1$, x and y being the molar fractions of the elements manganese and aluminum respectively.

A rutile crystallographic structure corresponds to a particular arrangement of elements in sites conventionally referred to as "sites F". The elements positioned on the sites F are normally referred to as "elements F".

Singled out in particular among the compounds exhibiting a rutile crystallographic structure are "oxides of rutile structure". These oxides comprise in particular compounds of formula $FO_2$.

For example, a manganese/niobium/titanium oxide of rutile structure is a compound where F is a mixture of manganese, niobium and titanium. Its structure is conventionally defined by a formula of the $(Mn_xNb_yTi_z)O_2$ type, with $x+y+z=1$, x, y and z being the molar fractions of the elements manganese, niobium and titanium.

An element A, B, C, D, E or F may comprise several constituents. A molar fraction of one of these constituents refers to the molar fraction of this constituent in said element.

In a chemical composition, the contents of oxides relate to the overall contents for each of the corresponding chemical elements, expressed in the form of the most stable oxide, only the oxide compounds being considered. For example, "$SiO_2$" measures the amount of silicon in the form of oxide compounds, all the possible silicon oxide compounds being considered: $SiO_2$, silicates, and the like. On the other hand, the amount of silicon in the $Si_3N_4$ form, which is not an oxide compound, is not counted in "$SiO_2$".

The term "impurities" is understood to mean the unavoidable constituents necessarily introduced with the starting materials or resulting from reactions with these constituents. The impurities are not necessary constituents but only tolerated constituents. In particular, the compounds forming part of the group of the oxides, nitrides, oxynitrides, carbides, oxycarbides, carbonitrides and metal entities of sodium and other alkali metals are impurities. Mention may be made, as an example, of $Na_2O$. On the other hand, hafnium oxide is not regarded as an impurity. It is considered that, in a sintered product according to the invention or in a starting charge according to the invention, a total content of impurities of less than 2% does not substantially modify the results obtained.

In a source of zirconia particles, $HfO_2$ cannot be dissociated chemically from $ZrO_2$. "$ZrO_2$" thus conventionally denotes the total content of these two oxides. According to the present invention, $HfO_2$ is not deliberately added to the starting charge. $HfO_2$ thus denotes only the traces of hafnium oxide, this oxide always being naturally present in the zirconia sources at contents generally of less than 2%. For the sake of clarity, the content of zirconia and of traces of hafnium oxide may thus be denoted without distinction by "$ZrO_2$" or also by "content of zirconia".

The term "stabilized zirconia" refers to a zirconia stabilized with a stabilizer and composed, for more than 80% by volume, indeed even more than 90% by volume, indeed even more than 95% by volume, indeed even substantially 100% by volume, of quadratic and/or cubic phase, the remainder to 100% being composed of monoclinic phase. The amount of stabilized zirconia is measured by X-ray diffraction. On a bulk item, the measurement surface is polished, the final polishing stage being carried out with a Mecaprex LD32-E 1 µm diamond preparation sold by Presi, after which the item was subjected to a heat treatment at 1000° C. for 1 hour and was cooled to ambient temperature. On a powder, the measurement is carried out directly on the powder, without premilling.

The term "precursor" of a product refers to a compound or a combination of compounds which, during sintering in stage c), under air, results in the formation of said product. In the specific case of an oxide of perovskite structure, a precursor of said oxide of perovskite structure is a compound composed of an intimate mixture of the oxides and/or of the precursors of the oxides composing said oxide of perovskite structure. Such an intimate mixture may, for example, be obtained by coprecipitation or atomization. Preferably, the intimate mixture is consolidated by a heat treatment. For example, if a lanthanum/cobalt/iron/manganese oxide of perovskite structure of formula $LaCo_xFe_yMn_zO_3$, with $x+y+z=1$, x, y and z being the molar fractions of the elements cobalt, iron and manganese respectively, is considered, a precursor of this oxide of perovskite structure is an intimate mixture of lanthanum oxide, cobalt oxide, iron oxide and manganese oxide. Another possible precursor is an intimate mixture of precursors of these oxides, such as, for example, an intimate mixture of lanthanum nitrate, cobalt nitrate, iron nitrate and manganese nitrate.

An amount of a precursor of a product is described as "equivalent" to an amount of said product when, during sintering, it results in said amount of said product.

The term "temporary" is understood to mean "which may be removed from the preform during sintering".

The term "mean size" of the grains of a sintered part refers to the dimension measured according to the "Mean Linear Intercept" method described in the standard ASTM E1382-97. The results obtained by this standard were multiplied by a correcting coefficient equal to 1.56 in order to take into account the three-dimensional aspect.

The term "median size" of a combination of particles, generally denoted $D_{50}$, refers to the size dividing the particles of this combination into a first population and a second population which are equal in weight, these first and second populations comprising only particles exhibiting a size respectively greater than or less than the median size.

The percentiles or "centiles" 10 ($D_{10}$) and 90 ($D_{90}$) are the particle sizes corresponding to the percentages by weight of 10% and 90% respectively on the cumulative particle size distribution curve of the sizes of particles of the powder, the sizes of particles being categorized by increasing order. For example, 10% by weight of the particles of the powder have a size of less than $D_{10}$ and 90% of the particles by weight have a size of greater than $D_{10}$. The percentiles may be determined using a particle size distribution produced using a laser particle sizer.

The length of a particle is its greatest dimension. The width of a particle is its greatest dimension perpendicular to the direction of its length.

The specific surface is calculated by the BET (Brunauer-Emmett-Teller) method as described in the *Journal of the American Chemical Society*, 60 (1938), pages 309 to 316.

Unless otherwise mentioned, in the formulae, the indices are molar fractions.

Unless otherwise mentioned, all the percentages are percentages by weight.

Unless otherwise mentioned, the term "comprising a" is understood to mean "comprising at least one". A particulate mixture according to the invention may thus comprise, for example, a first pigment made of an oxide of perovskite structure and a second pigment made of an oxide of spinel structure.

The generic definition of the composition of the particles of an assembly of particles, for example by means of a formula or of a structure, means that this assembly may be composed of particles all exhibiting the same composition or different compositions, each particle having a composition observing said generic definition. For example, in an assembly of "particles made of a compound of formula $XAl_mO_n$", X and/or m and/or n may be different according to the particle under consideration. Likewise, an assembly comprising particles made of a zirconium and praseodymium orthosilicate and particles made of a zirconium orthosilicate is an assembly of "particles made of a compound chosen from the group of the zirconium and praseodymium orthosilicates (Zr,Pr) $SiO_4$, of the zirconium and vanadium orthosilicates (Zr, V)$SiO_4$ and of the zirconium orthosilicates". Likewise, an assembly composed of particles made of different cordierites is an assembly of "particles made of cordierite" or an assembly composed of particles made of different oxides of spinel structure is an assembly of particles "made of an oxide of spinel structure". More generally, the expression "particles made of an oxide" of a predetermined structure, it being possible for said structure to correspond to n different oxides, for example "particles made of an oxide of perovskite structure", includes any assembly of particles, each particle of which is composed of an oxide exhibiting said structure, it being possible for this assembly to comprise particles of each of the n oxides.

The crystalline SiAlON phases and the SiAlON compounds observe one of the following formulae:

$Si_tAl_wO_uN_v$, in which:

t is greater than 0, greater than 0.05, greater than 0.1 or greater than 0.2, and less than or equal to 1, less than or equal to 0.8 or less than or equal to 0.4, w is greater than or equal to 0, greater than 0.1, greater than 0.3 or greater than 0.5, and less than or equal to 1, u is greater than or equal to 0, greater than 0.1 or greater than 0.2, and less than or equal to 1, or less than or equal to 0.7, v is greater than 0, greater than 0.1, greater than 0.2, greater than 0.5 or greater than 0.7, and less than or equal to 1, t+w>0, t, w, u and v being stoichiometric indices standardized with respect to the highest one, rendered equal to 1;

$Me_sSi_{12-(q+r)}Al_{(q+r)}O_rN_{16-r}$, with $0 \le s \le 2$, Me a cation chosen from cations of lanthanides, Fe, Y, Ca and their mixtures, $0 \le q \le 12$, $0 \le r \le 12$ and $q+r \le 12$, generally referred to as "α'-SiAlON" or "SiAlON-α'".

The crystalline SiAlON phases and the SiAlON compounds may thus comprise:

AlN phases and/or one of its polytypes, in particular 2H, 8H, 12H, 15R, 21R and 27R, of formula $Si_{t'}Al_{w'}O_{u'}N_{v'}$, in which the stoichiometric indices t', w', u' and v', standardized with respect to the highest index, rendered equal to 1, are such that $0 \le t' \le 0.37$ and $0.60 \le w' \le 1$ and $0 \le u' \le 0.71$ and $0.76 \le v' \le 1$;

phases of formula $Si_{t''}Al_{w''}O_{u''}N_{v''}$, in which the stoichiometric indices t'', w'', u'' and v'', standardized with respect to the highest index rendered equal to 1, are such that $0.43 \le t'' \le 0.75$ and $0 \le w'' \le 1$ and $0 \le u'' \le 1$ and $0.9 \le v'' \le 1$, referred to as "β'-SiAlON". The "β'-SiAlON" crystalline phases may also be expressed with the formula $Si_{6-z}Al_zO_zN_{8-z}$, in which the z index is a stoichiometric index such that $0 \le z \le 4.2$;

phases of formula $Si_{t'''}Al_{w'''}O_{u'''}N_{v'''}$, in which the stoichiometric indices t''', w''', u''' and v''', standardized with respect to the highest index rendered equal to 1, are such that t'''=1 and $0 \le w''' \le 0.11$ and $0.5 \le u''' \le 0.67$ and v'''=1, referred to as "O'—SiAlON". The "O'—SiAlON" crystalline phases may also be expressed with the formula $Si_{2-z'}Al_{z'}O_{1+z'}N_{2-z'}$, in which the z' index is a stoichiometric index such that $0 \le z' < 0.2$;

$Si_3N_4$;

$Si_2ON_2$;

AlON.

Conventionally, "$Si_3N_4$" denotes all the forms of $Si_3N_4$ (namely α-$Si_3N_4$ and β-$Si_3N_4$).

The term "lanthanides" refers to the chemical elements having an atomic number between 57 (lanthanum) and 71 (lutetium), lanthanum and lutetium being included in said lanthanides.

DETAILED DESCRIPTION

In stage a), a particulate mixture according to the invention is prepared.

Preferably, the particulate mixture exhibits a specific surface, calculated by the BET method, of greater than 3 m²/g, preferably of greater than 5 m²/g, and/or of less than 30 m²/g, preferably of less than 25 m²/g, preferably of less than 20 m²/g. Preferably again, it exhibits a median size ($D_{50}$) of less than 10 μm, indeed even of less than 5 μm, indeed even of less than 3 μm, indeed even of less than 1 μm, and/or preferably of greater than 0.05 μm.

A milling may be carried out in order for each of the powders used in stage a) or in order for the particulate mixture to exhibit the desired particle size characteristics, in particular in order to obtain good densification of the sintered part. In particular, a milling may be carried out in order for the first particulate fraction to exhibit a median size ($D_{50}$) of less than 1000 nm and/or for the second particulate fraction to exhibit a size ($D_{50}$) of less than 10 000 nm.

According to the invention, the particulate mixture comprises first and second particulate fractions, the other particulate fractions being optional.

The first, second, third and fourth particulate fractions are not necessarily added separately to the particulate mixture. The term "particulate fraction" means only that, starting from the particulate mixture, it is possible to separate the particles so as to form the first, second, third and fourth particulate fractions.

In one embodiment, the particulate mixture is composed of the first, second and fourth particulate fractions.

In one embodiment, the particulate mixture is composed of the first, second, third and fourth particulate fractions.

First Particulate Fraction

Preferably, the first particulate fraction represents more than 70%, indeed even more than 75%, and/or less than 85% of the particulate mixture, as percentage by weight.

Preferably, the median size of the particles of the first particulate fraction is between 100 nm and 1000 nm, preferably less than 800 nm, indeed even less than 500 nm. Preferably, the particle size distribution curve of the first particulate fraction is such that the ratio $(D_{90}-D_{10})/D_{50}$ is less than 10, indeed even less than 5, indeed even less than 3, indeed even less than 2.

In one embodiment, provided that the second particulate fraction comprises less than 25% by weight of particles exhibiting a length/width ratio of greater than 3, more than 25%, indeed even more than 40%, indeed even more than 50%, by weight of the particles of the first particulate fraction exhibit a length/width ratio of greater than 3, indeed even of greater than 5, indeed even of greater than 7, indeed even of greater than 10. Advantageously, the mechanical properties of the sintered part obtained at the end of stage c) are thereby improved.

The zirconia particles of the first particulate fraction comprise a compound capable of stabilizing the zirconia chosen from $Y_2O_3$, $Sc_2O_3$, MgO, CaO, $CeO_2$ and their mixtures, in an amount of greater than 2.0% and less than 20.0%, calculated on the basis of the sum of $ZrO_2$, $Y_2O_3$, $Sc_2O_3$, MgO, CaO and $CeO_2$, the MgO+CaO content being less than 5.0% on the basis of the sum of $ZrO_2$, $Y_2O_3$, $Sc_2O_3$, MgO, CaO and $CeO_2$.

The compound capable of stabilizing the zirconia may be chosen from the group formed by $Y_2O_3$, $Sc_2O_3$ and their mixtures, the content of the compound capable of stabilizing the zirconia then preferably being less than 8%, preferably less than 6.5%, or from the group formed by MgO, CaO and their mixtures, the content of the compound capable of stabilizing the zirconia then preferably being less than 4%, or from the group formed by $Y_2O_3$, $CeO_2$ and their mixtures, the content of the compound capable of stabilizing the zirconia then preferably observing the relationship $10\% \leq 3.Y_2O_3 + CeO_2 \leq 20\%$, the percentages being percentages by weight on the basis of the sum of $ZrO_2$, $Y_2O_3$, $Sc_2O_3$, MgO, CaO and $CeO_2$.

In one embodiment, the compound capable of stabilizing the zirconia is $CeO_2$, that is to say that the first particulate fraction comprises only $CeO_2$ as compound capable of stabilizing the zirconia, the content of the compound capable of stabilizing the zirconia then preferably being greater than 10% and less than 15%, as percentage by weight on the basis of the sum of $ZrO_2$, $Y_2O_3$, $Sc_2O_3$, MgO, CaO and $CeO_2$.

In one embodiment, the compound capable of stabilizing the zirconia is $Y_2O_3$, that is to say that the first particulate fraction comprises only $Y_2O_3$ as compound capable of stabilizing the zirconia, the content of the compound capable of stabilizing the zirconia then preferably being greater than 3%, preferably greater than 4%, and/or less than 8%, preferably less than 6.5%, as percentage by weight on the basis of the sum of $ZrO_2$, $Y_2O_3$, $Sc_2O_3$, MgO, CaO and $CeO_2$.

The zirconia, stabilized or nonstabilized, and at least a portion, indeed even all, of the compound capable of stabilizing the zirconia are preferably intimately mixed. Such an intimate mixture may, for example, be obtained by coprecipitation or atomization and be optionally consolidated by a heat treatment.

A portion, indeed even all, of the compound capable of stabilizing the zirconia may also stabilize the zirconia, the compound capable of stabilizing the zirconia then being conventionally referred to as "stabilizer".

In the first particulate fraction, the zirconia is preferably for more than 50%, preferably more than 80%, preferably more than 90%, preferably more than 95%, preferably more than 99%, by weight in a quadratic and/or cubic crystallographic form, the remainder being in a monoclinic crystallographic form.

Second Particulate Fraction

Preferably, the second particulate fraction represents more than 15% and/or less than 40%, preferably less than 30%, preferably less than 25%, of the particulate mixture, as percentage by weight.

Preferably, the median size of the particles of the second particulate fraction is between 100 nm and 10 000 nm, preferably less than 5000 nm, indeed even less than 1000 nm. Preferably, the particle size distribution curve of the second particulate fraction is such that the ratio $(D_{90}-D_{10})/D_{50}$ is less than 10, indeed even less than 5, indeed even less than 3, indeed even less than 2.

Preferably, more than 25%, indeed even more than 40%, indeed even more than 50%, by weight of the particles of the second particulate fraction exhibit a length/width ratio of greater than 3, indeed even of greater than 5, indeed even of greater than 7, indeed even of greater than 10. Advantageously, the mechanical properties of the sintered part obtained at the end of stage c) are thereby improved.

Preferably, the second particulate fraction is composed of $MgAl_2O_4$ particles and/or of particles of a compound of formula $XAl_mO_n$, with X chosen from Mg, Ca, Sr, Y, lanthanide oxides and their mixtures, m being an integer such that $10 \leq m \leq 12$, n being an integer such that $16 \leq n \leq 20$, and/or of particles made of a compound of formula $X_xAl_aSi_bO_c(OH)_y(H_2O)_z$, with X chosen from Mg, Ca, Sr, Sc, Y, lanthanide oxides, Ti, Zr, Fe, Mn, Co, Cr and their mixtures, x, a, b, c, y and z being integers such that x+a>0, c>0, b>0, a/b≤2, x/b≤1, y 3(a+x) and z b, and/or of $Si_3N_4$ particles and/or of AlN particles and/or of AlON particles and/or of $Si_2ON_2$ particles and/or of particles made of a mixture of these compounds (for example, particles composed of $MgAl_2O_4$ and $Mg_2Al_3(Si_5AlO_{18})$.

Preferably, the second particulate fraction is composed of $MgAl_2O_4$ particles and/or of $MgAl_{12}O_{19}$ particles and/or of $LaAl_{11}O_{18}$ particles and/or of particles made of a compound of formula $X_xAl_aSi_bO_c(OH)_y(H_2O)_z$, with X chosen from Mg, Ca, Sr, Sc, Y, lanthanide oxides, Ti, Zr, Fe, Mn, Co, Cr and their mixtures, x, a, b, c, y and z being integers such that x+a>0, c>0, b>0, a/b≤2, x/b≤1, y 3(a+x) and z b, and/or of particles made of a mixture of these compounds.

Preferably, the second particulate fraction is composed of $MgAl_2O_4$ particles and/or of $MgAl_{12}O_{19}$ particles and/or of $LaAl_{11}O_{18}$ particles and/or of particles made of an orthosilicate and/or of particles made of a sorosilicate and/or of particles made of a cyclosilicate and/or of particles made of an inosilicate and/or of particles made of a phyllosilicate and/or of particles made of a tectosilicate and/or of mullite $3(Al_2O_3)_2(SiO_2)$ particles and/or of particles made of a clay and/or of particles made of a mixture of these compounds.

Preferably, the particles made of an orthosilicate are particles made of forsterite $Mg_2SiO_4$ and/or particles made of garnet $Mg_3Al_2(SiO_4)_3$ and/or particles made of grossular $Ca_3Al_2(SiO_4)_3$ and/or particles made of zircon $ZrSiO_4$ and/or particles made of andalusite $Al_2SiO_5$ and/or particles made of sphene $CaTiSiO_5$ and/or particles made of a mixture of these compounds. Preferably, the particles made of an orthosilicate are particles made of garnet $Mg_3Al_2(SiO_4)_3$ and/or particles made of grossular $Ca_3Al_2(SiO_4)_3$ and/or particles made of zircon $ZrSiO_4$ and/or particles made of sphene $CaTiSiO_5$ and/or particles made of a mixture of these compounds.

Preferably, the particles made of a sorosilicate are particles made of epidote $Ca_2Al_3(SiO_4)(Si_2O_7)OOH$ and/or particles made of an yttrium silicate, such as $Y_2Si_2O_7$, it being possible for the yttrium to be partly replaced by Sc: $(Sc,Y)_2Si_2O_7$, and/or particles made of melilite $X_2ZSi_2O_7$, with X chosen from Y, lanthanide oxides and their mixtures and Z chosen from Mg, Al and their mixtures, and/or particles made of a mixture of these compounds.

Preferably, the particles made of a cyclosilicate are particles made of a cordierite, preferably made of $Mg_2Al_3(Si_5AlO_{18})$.

Preferably, the particles made of an inosilicate are particles made of a pyroxene, such as $MgSiO_3$ and $(Ca,Mg)Si_2O_6$, and/or particles made of an amphibole of formula $(Ca, Al, Mg)_7Si_8O_{22}(OH)_2$ and/or particles made of a mixture of these compounds. Preferably, the particles made of an inosilicate are particles made of an amphibole of formula $(Ca, Al, Mg)_7Si_8O_{22}(OH)_2$.

Preferably, the particles made of a phyllosilicate are serpentine $Mg_3Si_2O_5(OH)_4$ particles and/or talc $Mg_3Si_4O_{10}(OH)_2$ particles and/or pyrophyllite $Al_2Si_4O_{10}(OH)_2$ particles and/or particles made of a mixture of these compounds. Preferably, the particles made of a phyllosilicate are talc $Mg_3Si_4O_{10}(OH)_2$ particles.

Preferably, the particles made of a tectosilicate are particles made of a feldspar, preferably made of $(Ca, Sr)Al_2Si_2O_8$.

Preferably, the particles made of a clay are particles made of a kaolinite and/or particles made of a montmorillonite and/or particles made of a vermicullite and/or particles made of a mixture of these compounds. Preferably, the particles made of a clay are particles made of kaolinite $Si_2O_5Al_2(OH)_4$ and/or particles made of montmorillonite $Si_4O_{10}(Al,Mg)_3(OH)_2$ and/or particles made of vermicullite $(Mg, Ca)(MgAl)_6(Al,Si)_8O_{22}(OH)_4 \cdot 8H_2O$ and/or particles made of a mixture of these compounds.

In a preferred embodiment, the second particulate fraction is composed:
of $MgAl_{12}O_{19}$ particles, preferably in the form of particles exhibiting a length/width ratio of greater than 3, indeed even of greater than 5, indeed even of greater than 7, indeed even of greater than 10;
of $LaAl_{11}O_{18}$ particles, preferably in the form of particles exhibiting a length/width ratio of greater than 3, indeed even of greater than 5, indeed even of greater than 7, indeed even of greater than 10;
of garnet $Mg_3Al_2(SiO_4)_3$ particles;
of zircon $ZrSiO_4$ particles;
of epidote $Ca_2Al_3(SiO_4)(Si_2O_7)OOH$ particles;
of particles of an yttrium silicate, such as $Y_2Si_2O_7$, it being possible for the yttrium to be partially replaced by Sc: $(Sc,Y)_2Si_2O_7$;
of melilite $X_2ZSi_2O_7$ particles, with X chosen from Y, lanthanide oxides and their mixtures and Z chosen from Mg, Al and their mixtures and their mixtures;
of cordierite $Mg_2Al_3(Si_5AlO_{18})$ particles;
of particles of an amphibole of formula $(Ca, Al, Mg)_7Si_8O_{22}(OH)_2$;
of talc $Mg_3Si_4O_{10}(OH)_2$ particles;
of particles of a feldspar $(Ca, Sr)Al_2Si_2O_8$;
of mullite $3(Al_2O_3)_2(SiO_2)$ particles;
of kaolinite $Si_2O_5Al_2(OH)_4$ particles;
of montmorillonite $Si_4O_{10}(Al,Mg)_3(OH)_2$ particles;
of vermicullite $(Mg,Ca)(MgAl)_6(Al,Si)_8O_{22}(OH)_4 \cdot 8H_2O$ particles;
or of a mixture of such particles.

Third Particulate Fraction

The third particulate fraction may represent more than 0.5% and/or less than 8% of the particulate mixture, as percentage by weight on the basis of the particulate mixture.

The inventors have discovered that, if the third particulate fraction represents more than 10.0% of the particulate mixture, the mechanical properties, in particular of toughness, of the sintered parts manufactured are damaged. This deterioration is problematic in particular when the sintered parts are intended for the manufacture of housings exposed to the outside world.

A minimum content of 0.5% of the third particulate fraction in the particulate mixture contributes to the achievement of well developed and homogenous colors.

Preferably, the median size of the particles of the third particulate fraction is less than 1000 nm, indeed even less than 500 nm. Advantageously, the effectiveness of these particles in the sintered part is thereby improved.

Preferably, the third particulate fraction is composed:
of particles made of an oxide of perovskite structure, optionally completely or partially replaced by an equivalent amount of precursor(s) of these oxides, and/or of particles made of a mixture of perovskites and/or of perovskite precursor(s) and/or
of particles made of an oxide of spinel structure and/or of particles made of a mixture of spinels, and/or
of particles made of an oxide of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese and mixtures of tin and chromium, and/or of particles made of a mixture of these compounds, and/or
of particles made of an oxide of hematite structure $E_2O_3$, the element E being chosen from the group $G_E(1)$ formed by mixtures of aluminum and chromium and mixtures of aluminum and manganese, and/or of particles made of a mixture of these compounds, and/or
of particles made of a zirconium and praseodymium orthosilicate $(Zr,Pr)SiO_4$ and/or of particles made of a zirconium and vanadium orthosilicate (Zr,V)SiO$_4$ and/or of particles made of a zirconium orthosilicate in which iron oxide occurs in inclusion.

Advantageously, the sintered part exhibits a particularly decorative color.

Preferably, the third particulate fraction is composed:

of particles made of an oxide of perovskite structure ABO$_3$ which may comprise one, indeed even several, of the following optional characteristics:
- the element A at the site A of the perovskite structure is chosen from the group $G_A(1)$ formed by calcium Ca, strontium Sr, barium Ba, lanthanum La, praseodymium Pr, neodyme Nd, bismuth Bi, cerium Ce, and their mixtures;
- preferably, A is chosen from the group $G_A(2)$ formed by lanthanum, praseodymium, neodyme, bismuth, cerium, and their mixtures;
- preferably, A is chosen from the group $G_A(3)$ formed by lanthanum;
- the element B at the site B of the perovskite structure is chosen from the group $G_B(1)$ formed by mixtures of cobalt and iron, mixtures of cobalt and manganese, mixtures of cobalt and chromium, mixtures of cobalt and nickel, mixtures of chromium and manganese, mixtures of chromium and nickel, mixtures of chromium and iron, mixtures of manganese and iron, mixtures of manganese and nickel, mixtures of nickel and iron, mixtures of cobalt and titanium, mixtures of cobalt and copper, cobalt, mixtures of chromium and titanium, mixtures of chromium and copper, mixtures of nickel and titanium, chromium, nickel, copper, iron, mixtures of nickel and copper, and their mixtures;
- preferably, the element B is chosen from the group $G_B(2)$ formed by mixtures of cobalt and iron, mixtures of cobalt and manganese, mixtures of chromium and manganese, mixtures of chromium and iron, mixtures of cobalt and chromium and iron, mixtures of cobalt and chromium and iron and manganese, mixtures of cobalt and iron and manganese, mixtures of cobalt and chromium, mixtures of cobalt and nickel, mixtures of cobalt and titanium, mixtures of cobalt and copper, cobalt, mixtures of chromium and nickel, mixtures of chromium and titanium, mixtures of chromium and copper, mixtures of chromium and iron and manganese, mixtures of nickel and iron, mixtures of nickel and manganese, mixtures of nickel and cobalt, mixtures of nickel and titanium, mixtures of nickel and cobalt and chromium, mixtures of nickel and cobalt and chromium and manganese, mixtures of nickel and chromium and manganese, chromium, nickel, copper;

and/or of particles made of an oxide of spinel structure CD$_2$O$_4$ or D(C,D)O$_4$ which may comprise one, indeed even several, of the following optional characteristics:
- the element C of the spinel structure is chosen from the group $G_C(1)$ formed by nickel Ni in a molar fraction of between 0 and 0.2 or in a molar fraction equal to 1, copper Cu in a molar fraction of between 0 and 0.2, iron Fe in a molar fraction of between 0.2 and 0.6 or in a molar fraction equal to 1, zinc Zn in a molar fraction of between 0 and 0.2 or in a molar fraction equal to 1, manganese Mn in a molar fraction of between 0 and 0.4, cobalt Co in a molar fraction of between 0 and 0.4 or in a molar fraction of between 0.4 and 1, tin Sn in a molar fraction of between 0 and 0.2 or in a molar fraction equal to 1, mixtures of zinc and iron, mixtures of iron and manganese, mixtures of zinc and manganese, mixtures of cobalt and zinc, and their mixtures;
- preferably, the element C is chosen from the group $G_C(2)$ formed by nickel Ni in a molar fraction of between 0 and 0.2 or in a molar fraction equal to 1, iron Fe in a molar fraction of between 0.2 and 0.6 or in a molar fraction equal to 1, zinc Zn in a molar fraction equal to 1, manganese Mn in a molar fraction of between 0 and 0.4, cobalt Co in a molar fraction of between 0 and 0.4 or in a molar fraction of between 0.4 and 1, tin Sn in a molar fraction of between 0 and 0.2 or in a molar fraction equal to 1, mixtures of zinc and iron, mixtures of iron and manganese, mixtures of zinc and manganese, mixtures of cobalt and zinc, and their mixtures;
- the element D of the spinel structure is chosen from the group $G_D(1)$ formed by manganese Mn in a molar fraction of between 0 and 0.4, iron Fe in a molar fraction of between 0 and 0.6 or in a molar fraction equal to 1 (that is to say that D is the element Fe), chromium Cr in a molar fraction of between 0.2 and 0.6 and in a molar fraction equal to 1, aluminum Al in a molar fraction of between 0 and 1, titanium Ti in a molar fraction of between 0 and 1, cobalt in a molar fraction equal to 1, except if the element C is cobalt, mixtures of iron and chromium, mixtures of iron and chromium and manganese, mixtures of manganese and chromium, mixtures of aluminum and chromium, and their mixtures;
- preferably, the element D is chosen from the group $G_D(2)$ formed by manganese Mn in a molar fraction of between 0 and 0.4, iron Fe in a molar fraction of between 0.2 and 0.6 and in a molar fraction equal to 1, chromium Cr in a molar fraction of between 0 and 0.6 and in a molar fraction equal to 1, aluminum Al in a molar fraction equal to 1, titanium Ti in a molar fraction equal to 1, cobalt in a molar fraction equal to 1, except if the element C is cobalt, mixtures of iron and chromium, mixtures of iron and chromium and manganese, mixtures of manganese and chromium, mixtures of aluminum and chromium, and their mixtures;

and/or of particles made of an oxide of hematite structure E$_2$O$_3$, the element E being chosen from the group $G_E(1)$ formed by mixtures of aluminum and chromium, mixtures of aluminum and manganese, and their mixtures;

and/or of particles made of an oxide of rutile structure FO$_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and their mixtures;

and/or of particles made of an orthosilicate chosen from the group of zirconium and praseodymium orthosilicates (Zr,Pr)SiO$_4$, zirconium and vanadium orthosilicates (Zr,V)SiO$_4$, zirconium orthosilicates in which iron oxide occurs in inclusion, and their mixtures.

The particles of the third particulate fraction may be manufactured, in a known way, by different processes, such as melting, solid-phase synthesis, pyrolysis of salts, precipitation of hydroxides and their calcination, or synthesis by the sol-gel route.

Fourth Particulate Fraction

The fourth particulate fraction preferably represents less than 1.5%, preferably less than 1%, more preferably less than 0.5%, preferably less than 0.2%, preferably less than 0.1%, as percentage by weight. Preferably, the fourth particulate fraction is composed of the impurities.

In one embodiment, the oxides represent more than 98%, more than 99%, indeed substantially 100%, of the weight of the particulate mixture.

The particulate mixture may have been subjected to an additional stage, for example an atomization stage, before passing to stage b), in particular in order to improve the chemical homogeneity thereof.

A "ready-for-use" particulate mixture according to the invention may be employed. In an alternative form, all the particulate oxide starting materials may be metered in at the time of the preparation of the starting charge.

In addition to the particulate mixture, the starting charge may conventionally comprise one or more defloculant(s) and/or binder(s) and/or lubricant(s), preferably temporary, conventionally used in forming processes for the manufacture of preforms to be sintered, for example an acrylic resin, polyethylene glycol (PEG) or polyvinyl alcohol (PVA).

Finally, the starting charge may conventionally comprise a solvent, preferably an aqueous solvent, for example water, the amount of which is adjusted to the process used for the forming of the starting charge.

Preferably, the particulate mixture represents more than 90%, preferably more than 95%, indeed even more than 99%, of the weight of the starting charge, the remainder to 100% being composed of the defloculant(s), binder(s), lubricant(s) or solvent and by the impurities. The impurities preferably represent less than 2% of the starting charge.

In stage b), the starting charge is formed, for example by uniaxial pressing, in order to form preforms having the desired dimensions.

Other techniques, such as slip casting, tape casting, isostatic pressing, the casting of a gel, injection molding or a combination of these techniques may be used.

Before stage c), the preform may optionally be subjected to a drying stage and/or to a machining stage and/or to a binder-removing stage and/or to a presintering stage. The presintering stage advantageously makes possible more precise machining operations and also makes it possible to achieve high densities when the sintering is carried out by HIP.

In stage c), the preform is sintered, preferably under air, at atmospheric pressure or under pressure (hot pressing or hot isostatic pressing (HIP)) and at a temperature of between 1200° C. and 1600° C., preferably between 1400° C. and 1500° C., except when the second particulate fraction comprises, indeed even is composed of, particles made of an orthosilicate, in particular $Mg_3Al_2(SiO_4)_3$, $Ca_3Al_2(SiO_4)_3$, $CaTiSiO_5$, and/or of particles made of a sorosilicate, in particular $Ca_2Al_3(SiO_4)(Si_2O_7)OOH$, and/or of particles made of an inosilicate, in particular $(Ca, Al, Mg)_7Si_8O_{22}(OH)_2$, and/or of particles made of tectosilicate, in particular feldspars, and/or of particles made of a clay, in particular a vermiculite, in which case the temperature is preferably between 1250° C. and 1350° C. Advantageously, a sintering in this temperature range promotes the development of good mechanical properties. For example, the sintering may be carried out at 1300° C. for the preforms incorporating silicate-comprising particles (resulting from the second particulate fraction) or at 1450° C. for the preforms incorporating particles made of an aluminous compound.

The time for maintenance at this temperature is preferably between 2 and 8 hours. The rate of rise is conventionally between 10 and 100° C./h. The rate of descent may be free. If defloculant(s) and/or binder(s) and/or lubricants are used, the sintering cycle preferably comprises a stationary phase of 1 to 4 hours at a temperature of between 400° C. and 800° C. in order to promote the removal of said products.

If the second particulate fraction comprises, indeed even is composed of, particles of SiAlON phase(s), in particular particles made of $Si_3N_4$, and/or of particles made of AlN and/or of particles made of $Si_2ON_2$ and/or of particles made of an AlON, the sintering atmosphere is preferably inert, for example under argon and/or nitrogen, or weakly reducing, such as, for example, under a mixture of argon and/or nitrogen and hydrogen, the mixture preferably comprising less than 10 vol % of hydrogen.

The parameters of the manufacturing process, in particular the size grading of the particles of the starting charge, the sintering additive, the compression in order to manufacture the preform and the sintering temperature, may be adjusted, in a known way, in order to adjust the density of the sintered part to the application targeted.

The sintered part obtained at the end of stage c) may be machined and/or subjected to a surface treatment, such as, for example, a polishing (stage d)) and/or a sandblasting and/or a chemical treatment (for example a hydrophobic treatment) and/or a redox treatment, according to any technique known to a person skilled in the art.

In stage f), the sintered part is incorporated as structural and/or decorative element in a device according to the invention, so as to constitute a housing thereof.

Communication Device

The communication device comprises a transmitter and/or a receiver of radio waves having frequencies of between 800 MHz and 3 GHz and a housing.

The transmitter is an electronic system suitable for processing a signal which it receives, for example a sound signal, such as a voice, and consequently transmitting radio waves having frequencies of between 800 MHz and 3 GHz.

The receiver is an electronic system suitable for receiving radio waves having frequencies of between 800 MHz and 3 GHz, and then processing them, for example in order to convert them into a signal, for example sound.

For example, in the case of a telephone, the waves received are processed by the receiver in order to be converted into a sound signal which the user can hear and the voice of the user is processed by the transmitter in order to be converted into waves, these waves being transmitted bound for the telecommunication network.

The transmitter and/or the receiver may be configured in order to transmit and/or receive, respectively, ultrashort (FM) waves, radiofrequency (RF) waves, waves in accordance with the Bluetooth™ standard, waves in accordance with the "Global System for Mobile Communications" (GSM) standard, waves in accordance with the "Digital Communication System" (DCS) standard and/or waves in accordance with the "Personal Communications Service" (PCS) standard.

The transmitter and/or the receiver may be configured in order to transmit and/or receive, respectively, waves having a frequency of greater than 30 MHz, indeed even of greater than 300 MHz, and/or of less than 20 GHz, indeed even of less than 3 GHz.

The communication device is not limited and may in particular be a telephone, a photographic camera, a television or movie camera, a computer, a tablet computer, a digital set top box for television or for computer, a modem, a decoder, a portable radio, or a WiFi receiver or transmitter. The communication device may be portable. It may exhibit a weight of less than 1 kg, preferably of less than 500 g.

In one embodiment, the housing is completely exposed to the external environment. It may be apparent without dismantling, even partial dismantling, of the device.

The housing may be fixed, in detachable or nondetachable fashion, to a support of the device. It may in particular be adhesively bonded, clipped, sewn, inserted by force or cosintered with its support.

In one embodiment, the housing defines the entire external surface of the device, that is to say the surface of the device exposed to the external environment.

EXAMPLES

The chemical analyses were carried out by X-ray fluorescence as regards the constituents having a content of greater than 0.5%. The content of the constituents present in an amount of less than 0.5% was determined by AES-ICP (Atomic Emission Spectroscopy-Inductively Coupled Plasma).

The specific surface was measured by adsorption of nitrogen at 77K and was calculated by the single point BET method, the samples being pretreated at 300° C. under a stream of nitrogen for 2 hours before analysis.

The particle size distributions were determined by sedigraph analysis, using a Sedigraph 5100 sedigraph from Micromeritics®, after having dispersed, under ultrasound, a suspension of the powders to be characterized in the presence of sodium metaphosphate.

The crystalline phases in a powder or in a sintered part were determined by X-ray diffraction on a Brucker D5000 device (with an adjustment for 2θ of 5° to 80°, with a step of 0.02° and 1 second per step). Prior to the measurement, the sintered part was polished, the final polishing stage having been carried out with a Mecaprex LD32-E 1 µm diamond preparation sold by Presi, then heat treated at 1000° C. for 1 hour and cooled to ambient temperature.

An EDS (Energy Dispersive Spectroscopy) analysis, an X-ray diffraction analysis and/or a microprobe elemental mapping may also be carried out in order to identify the nature of the constituents of the sintered part resulting from the third particulate fraction. Alternatively, it is possible to subject the particulate mixture according to the invention, preferably after shaping said particulate mixture, to a heat treatment, so as to demonstrate a coloration after said heat treatment, confirming the presence of a pigment.

The mean size of the grains of a sintered part was measured by a "Mean Linear Intercept" method according to the standard ASTM E1382-97. According to this standard, analysis lines are plotted on images of said sintered part and then, along each analysis line, the lengths, referred to as "intercepts", between two consecutive grain boundaries cutting said analysis line are measured. The mean length "l'" of the intercepts "I" is subsequently determined. For the tests below, the intercepts were measured on images, obtained by scanning electron microscopy, of sections of the sintered part, said sections having been polished beforehand until a mirror quality is obtained and then attacked by heat treatment for 30 min at a temperature lower by 100° C. than the sintering temperature in order to reveal the grain boundaries. The magnification used for taking the images was chosen so as to visualize approximately 500 grains on an image. 5 images per sintered part were produced. The results obtained by this standard were multiplied by a correcting coefficient equal to 1.56 in order to take into account the three-dimensional aspect.

The color measurements were carried out according to the standard NF ISO 7724 on polished parts, the final polishing stage of which was carried out with a Mecaprex LD32-E 1 µm diamond preparation sold by Presi, using a CM-2500d device manufactured by Konica Minolta, with illuminant D65 (natural light), observer at 10° and specular reflection excluded.

The hardness and the toughness of the sintered parts tested were measured by Vickers indentation on polished sintered parts, the final polishing stage having been carried out with a 1 µm diamond paste.

The flexural strength was measured at ambient temperature by 3-point bending on small machined and beveled bars with dimensions of 45 mm×4 mm×3 mm.

The dielectric properties of the sintered parts were measured on cylinders with a diameter of 25 mm and a thickness of 2 mm. The volume resistivity is measured according to the standard ASTM D257. The parts are covered with aluminum lamellae with a diameter of 12.7 mm and placed under a pressure of 0.05 MPa. A voltage of 500 V is applied to the sample and the current passing is recorded. The polarity of the voltage is alternated every 60 seconds for 6 minutes. The volume resistivity value is a mean of the six measurements. The dielectric permittivity $\in_r$ and the loss coefficient tan δ are measured according to the standard ASTM D150. The parts are covered with aluminum lamellae with a diameter of 25 mm and placed under a pressure of 0.1 MPa. An alternating voltage with a variable frequency of between 1 Hz and 1 MHz is applied to the sample and the current passing is recorded.

The following nonlimiting examples are given with the aim of illustrating the invention.

Example 1, outside of the invention, is carried out starting from a particulate mixture consisting of an alumina powder, the main characteristics of which appear in the following table 1:

TABLE 1

|  | Alumina powder |
|---|---|
| $Al_2O_3$ (% by weight) | Remainder to 100% |
| $SiO_2$ (ppm) | 100 |
| $Na_2O$ (ppm) | 140 |
| CaO (ppm) | 70 |
| $Fe_2O_3$ (ppm) | 80 |
| MgO (ppm) | <20 |
| $TiO_2$ (ppm) | <20 |
| Specific surface (m$^2$/g) | 13 |
| $D_{10}$ (µm) | 0.2 |
| $D_{50}$ (µm) | 0.6 |
| $D_{90}$ (µm) | 1.5 |

2% of polyethylene glycol PEG 4000 and 45% of deionized water are added to the particulate mixture, so as to form a starting charge. The starting charge is dispersed in a mixer for 30 minutes and then dried by atomization. The powder thus obtained is sieved through a sieve with a mesh size equal to 250 µm.

The starting charge is formed by uniaxial pressing at a pressure of 100 MPa. The preforms obtained are provided in the form of pellets with a diameter of 32 mm and a thickness of 5 mm.

The preforms are subsequently dried at 110° C. for 12 hours.

The preforms are sintered according to the following cycle:
rise in temperature to 500° C. at 100° C./h,
maintenance at 500° C. for 2 hours,
rise in temperature up to 1450° C. at 100° C./h,
maintenance at 1450° C. for 2 hours,
drop in temperature by natural cooling.

The properties of the sintered parts obtained are summarized in table 3.

Example 2, outside of the invention, is carried out starting from a particulate mixture consisting of a zironia powder, the main characteristics of which appear in the following table 2:

TABLE 2

|  | Yttrium-comprising zirconia powder |
|---|---|
| $ZrO_2$ (% by weight) | Remainder to 100% |
| $Y_2O_3$ (% by weight) | 5.38 |
| $Al_2O_3$ (ppm) | 2500 |
| $SiO_2$ (ppm) | 100 |
| $Na_2O$ (ppm) | 140 |
| CaO (ppm) | 70 |
| $Fe_2O_3$ (ppm) | 80 |
| MgO (ppm) | <20 |
| $TiO_2$ (ppm) | <20 |
| Specific surface ($m^2/g$) | 13 |
| $d_{10}$ (μm) | 0.2 |
| $d_{50}$ (μm) | 0.6 |
| $d_{90}$ (μm) | 1.5 |

2% of polyethylene glycol PEG 4000 and 45% of deionized water are added to the particulate mixture, so as to form a starting charge. The starting charge is dispersed in a mixer for 30 minutes and then dried by atomization. The powder thus obtained is sieved through a sieve with a mesh size equal to 250 μm.

The starting charge is formed by uniaxial pressing at a pressure of 100 MPa. The preforms obtained are provided in the form of pellets with a diameter of 32 mm and a thickness of 5 mm.

The preforms are subsequently dried at 110° C. for 12 hours.

The preforms are sintered according to the following cycle:
rise in temperature to 500° C. at 100° C./h,
maintenance at 500° C. for 2 hours,
rise in temperature up to 1450° C. at 100° C./h,
maintenance at 1450° C. for 2 hours,
drop in temperature by natural cooling.

The properties of the sintered parts obtained are summarized in table 3.

Examples 3 to 11, according to the invention, are carried out starting from a particulate mixture obtained from the zirconia powder used in example 2 and:

for example 3, from a spinel $MgAl_2O_4$ powder, sold by Baikowski, exhibiting a purity of greater than 99.9% and a median size equal to 0.3 μm;

for example 4, from an $MgAl_{12}O_{19}$ powder, obtained by heat treatment of powder formed of boehmite AlOOH and magnesium hydroxide at 1500° C. for 5 h. The powder obtained exhibits a purity of greater than 99% and a morphology as platelet with a diameter equal to 5 μm;

for example 5, from a cordierite $Al_3Mg_2AlSi_5O_{18}$ powder, obtained by heat treatment of powder formed of boehmite AlOOH, magnesium hydroxide and Ludox colloidal silica at 1500° C. for 5 h. The powder is subsequently milled by the wet route in order to obtain a powder with a median size equal to 0.3 μm;

for example 6, from a forsterite $Mg_2SiO_4$ powder, exhibiting a purity of greater than 95%. The powder is milled by the wet route in order to obtain a powder with a median size equal to 0.3 μm;

for example 7, from a zircon $ZrSiO_4$ powder, sold by Moulin des Prés under the name ZK4, exhibiting a purity of greater than 98% and a median size equal to 3 μm;

for example 8, from a mullite $3Al_2O_3\text{-}2SiO_2$ powder, obtained by heat treatment of powder formed of boehmite AlOOH and Ludox colloidal silica at 1400° C. for 5 h. The powder is subsequently milled by the wet route in order to obtain a powder with a median size equal to 0.3 μm;

for example 9, from an epidote $Ca_2Al_3(SiO_4)_3OH$ powder, exhibiting a purity of greater than 95%. The powder is calcined at 800° C. for 2 h. The powder is subsequently milled by the wet route in order to obtain a powder with a median size equal to 0.3 μm;

for example 10, from a cordierite powder identical to that used in example 5 and, as third particulate fraction, a spinel $CoAl_2O_4$ powder, sold by Ferro, exhibiting a purity of greater than 99%, milled by the wet route in order to obtain a median size equal to 0.3 μm;

for example 11, from a forsterite powder identical to that used in example 6 and, as third particulate fraction, a hematite $Fe_2O_3$ powder, sold by BASF, exhibiting a purity of greater than 99% and a median size equal to 0.3 μm.

For each of the particulate mixtures thus obtained, 2% of polyethylene glycol PEG 4000 and 45% of demineralized water are added so as to form a starting charge. The starting charge is dispersed in a mixer for 30 minutes and then dried by atomization. The powder thus obtained is sieved through a sieve with a mesh size equal to 250 μm.

The starting charge is formed by uniaxial pressing at a pressure of 100 MPa. The preforms obtained are provided in the form of pellets with a diameter of 32 mm and a thickness of 5 mm.

The preforms are subsequently dried at 110° C. for 12 hours.

Said preforms were subsequently sintered according to the following cycle:
rise in temperature to 500° C. at 100° C./h,
maintenance at 500° C. for 2 hours,
rise in temperature up to a temperature T at 100° C./h,
maintenance at the temperature T for 2 hours,
drop in temperature by natural cooling.

The main characteristics of the manufacturing process and the properties of the sintered parts obtained are summarized in tables 3 and 4 respectively.

TABLE 3

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| | Particulate mixture | | | | | | | | | | |
| % Alumina powder | 100 | — | — | — | — | — | — | — | — | — | — |
| % Zirconia powder (first particulate fraction) | — | 100 | 80 | 80 | 80 | 80 | 80 | 80 | 80 | 76 | 76 |
| Nature of the second particulate fraction | — | — | $MgAl_2O_4$ | $MgAl_{12}O_{19}$ | cordierite | forsterite | zircon | mullite | epidote | cordierite | forsterite |

TABLE 3-continued

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| % of the second particulate fraction | — | — | 20 | 20 | 20 | 20 | 20 | 20 | 20 | 20 | 20 |
| Median size of the second particulate fraction (μm) | — | — | 0.2 | 5 | 0.3 | 0.3 | 3 | 0.3 | 0.3 | 0.3 | 0.3 |
| Nature of the third particulate fraction | — | — | — | — | — | — | — | — | — | $CoAl_2O_4$ | $Fe_2O_3$ |
| % of the third particulate fraction | — | — | — | — | — | — | — | — | — | 4 | 4 |
| Median size of the third particulate fraction (μm) | — | — | — | — | — | — | — | — | — | 0.3 | 0.2 |
| | Process | | | | | | | | | | |
| Sintering temperature T (° C.) | 1450 | 1450 | 1450 | 1450 | 1450 | 1350 | 1450 | 1450 | 1350 | 1450 | 1350 |

TABLE 4

| | 1 | 2 | 3 | 4 | 5 | 6 |
|---|---|---|---|---|---|---|
| Bulk density (g/cm³) | 3.95 | 6.05 | 5.31 | 5.40 | 4.75 | 5.10 |
| % $ZrO_2$ (+$HfO_2$) | <0.01 | 94.2 | 75.4 | 75.4 | 75.4 | 75.4 |
| % $Y_2O_3$ | <0.01 | 5.38 | 4.30 | 4.30 | 4.30 | 4.30 |
| % $Al_2O_3$ | >99.9 | 0.25 | 14.1 | 19.0 | 7.2 | 0.20 |
| % MgO | <0.002 | <0.002 | 5.62 | 1.21 | 2.76 | 11.5 |
| % $SiO_2$ | 0.01 | 0.01 | 0.01 | 0.01 | 10.2 | 8.54 |
| % Others | 0.05 | 0.05 | 0.05 | 0.05 | 0.10 | 0.10 |
| % of the first crystalline phase on the basis of the crystalline part | — | 100 | 80 | 80 | 90 | 95 |
| % of the second crystalline phase on the basis of the crystalline part | — | — | 20 | 20 | 10 | 5 |
| Nature of the second crystalline phase | — | — | $MgAl_2O_4$ | $MgAl_{12}O_{19}$ | $Mg_2Al_3(Si_5AlO_{18})$ | $Mg_2SiO_4$ and $MgSiO_3$ |
| Presence of a first vitreous amorphous phase | No | No | No | No | Yes | Yes |
| Composition of the first vitreous amorphous phase | — | — | — | — | 50% $SiO_2$, 35% $Al_2O_3$, 15% MgO | 47% $SiO_2$, 52.4% MgO, 0.1% $Al_2O_3$, 0.5% $Y_2O_3$ |
| Modulus of rupture (MPa) | 350 | 1200 | 800 | 1000 | 1000 | 900 |
| Vickers hardness (Hv) | 2100 | 1350 | 1400 | 1100 | 1100 | 1000 |
| Toughness (MPa · m$^{1/2}$) | 4 | 9 | 6 | 8 | 7 | 6 |
| Volume resistivity at 20° C. (Ω · cm) | $4.0 \times 10^{14}$ | $3.0 \times 10^{12}$ | $4.3 \times 10^{12}$ | $3.4 \times 10^{12}$ | $7.5 \times 10^{12}$ | $9.8 \times 10^{12}$ |
| Relative dielectric permittivity, $\epsilon_r$, at 1 MHz | 9.43 | 30 | 23.09 | 23.76 | 19.86 | 18.27 |
| Loss coefficient, tan δ, measured at 1 MHz | 0.038 | 0.046 | 0.047 | 0.054 | 0.049 | 0.047 |
| $\epsilon_r$ × tan δ, measured at 1 MHz | 0.36 | 1.38 | 1.09 | 1.28 | 0.97 | 0.86 |
| L*/a*/b* | — | — | — | — | — | — |

| | 7 | 8 | 9 | 10 | 11 |
|---|---|---|---|---|---|
| Bulk density (g/cm³) | 5.54 | 5.12 | 4.70 | 4.70 | 5.11 |
| % $ZrO_2$ (+$HfO_2$) | 88.8 | 75.4 | 75.4 | 72.3 | 72.3 |
| % $Y_2O_3$ | 4.29 | 4.29 | 4.30 | 4.12 | 4.10 |
| % $Al_2O_3$ | 0.21 | 14.6 | 7.1 | 8.9 | 0.19 |
| % MgO | 0.03 | 0.02 | 0.30 | 2.75 | 10.9 |
| % $SiO_2$ | 6.60 | 5.6 | 9.6 | 10.2 | 8.4 |
| % Others | 0.20 | 0.10 | 3.2 | 1.73 | 4.1 |
| % of the first crystalline phase on the basis of the crystalline part | 80 | 90 | 98 | 87 | 95 |
| % of the second crystalline phase on the basis of the crystalline part | 20 | 10 | 2 | 10 | 5 |
| Nature of the second crystalline phase | $ZrSiO_4$ | $3Al_2O_3 \cdot 2SiO_2$ and $Al_2O_3$ | $CaAl_2Si_2O_8$ | $Mg_2Al_3(Si_5AlO_{18})$ | $Mg_2SiO_4$ and $MgSiO_3$ and $Fe_2O_3$ |
| Presence of a first vitreous amorphous phase | No | Yes | Yes | Yes | Yes |
| Composition of the first vitreous amorphous phase | — | 30% $SiO_2$, 69.5% $Al_2O_3$, 0.5% $Y_2O_3$ | 50% $SiO_2$, 30% $Al_2O_3$, 20% CaO | 49.5% $SiO_2$, 35% $Al_2O_3$, 15% MgO, 0.5% CoO | 46.5% $SiO_2$, 51.4% MgO, 2% $Fe_2O_3$, 0.1% $Al_2O_3$ |

TABLE 4-continued

| | | | | | |
|---|---|---|---|---|---|
| Modulus of rupture (MPa) | 900 | 1000 | 700 | 1000 | 800 |
| Vickers hardness (Hv) | 1100 | 1000 | 900 | 1100 | 900 |
| Toughness (MPa·m$^{1/2}$) | 7 | 7 | 6 | 7 | 6 |
| Volume resistivity at 20° C. (Ω·cm) | $8.1 \times 10^{12}$ | $5.9 \times 10^{12}$ | $6.6 \times 10^{12}$ | $2.3 \times 10^{12}$ | $1.2 \times 10^{12}$ |
| Relative dielectric permittivity, $\epsilon_r$, at 1 MHz | 22.74 | 18.56 | 18.86 | 20.01 | 24.89 |
| Loss coefficient, tan δ, measured at 1 MHz | 0.050 | 0.048 | 0.046 | 0.048 | 0.053 |
| $\epsilon_r \times$ tan δ, measured at 1 MHz | 1.14 | 0.89 | 0.87 | 0.96 | 1.28 |
| L*/a*/b* | — | — | — | 45/5/−40 | 35/20/40 |

The inventors consider that the desired compromise is as follows:
- modulus of rupture of greater than 350 MPa, preferably of greater than 500 MPa, preferably of greater than 700 MPa, and
- toughness of greater than 4 MPa·m$^{1/2}$, preferably of greater than 5 MPa·m$^{1/2}$, preferably of greater than 6 MPa·m$^{1/2}$, preferably of greater than 7 MPa·m$^{1/2}$, and
- a product $\epsilon_r \times$ tan δ, measured at 1 MHz, of less than 1.35, preferably of less than 1.30, preferably of less than 1.2, preferably of less than 1.1, preferably of less than 1.

Examples 3 to 11 satisfy the compromise, examples 5, 6, 8 and 9 being particularly preferred.

As is now clearly apparent, a communication device according to the invention comprises a housing exhibiting both a high transparency to radio waves having frequencies of between 800 MHz and 3 GHz and a high resistance to impacts and scratches.

Of course, the present invention is not limited to the embodiments described, provided as illustrative and nonlimiting examples.

The invention claimed is:

1. A device for communication by radio waves having frequencies of between 800 MHz and 3 GHz comprising a ceramic housing exposed, at least in part, to the external environment of the device and through which at least a portion of said waves passes during the use of the device, this housing being at least partially composed of a sintered product exhibiting a chemical composition such that, as percentage by weight and for a total of 100%:
- 32% ≤ $ZrO_2$ ≤ 95%,
- 1% < $Y_2O_3$ + $CeO_2$ + $Sc_2O_3$ + MgO + CaO,
- 0% ≤ $CeO_2$ ≤ 26%,
- 0% ≤ MgO ≤ 43%,
- 0% ≤ CaO ≤ 37%,
- 0% ≤ $SiO_2$ ≤ 41%,
- 0% ≤ $Al_2O_3$ ≤ 55%,
- 0% ≤ $TiO_2$ ≤ 30%,
- 0% ≤ lanthanide oxides, except for $CeO_2$ ≤ 50%,
- 0% ≤ SrO ≤ 24%,
- 0% ≤ SiAlON compounds ≤ 50%,
- other compounds ≤ 15%, and said sintered product comprising, as percentage by weight on the basis of the sintered product and for a total of 100%:
- more than 50% of a crystalline part, said crystalline part comprising, as percentage by weight on the basis of the crystalline part and for a total of 100%:
  - more than 40% of a first crystalline phase composed of zirconia, more than 50% by weight of said zirconia being stabilized by means of a stabilizer in a quadratic and/or cubic form, the remainder being in a monoclinic form,
  - optionally, less than 50% of a second crystalline phase composed of a compound chosen from $MgAl_2O_4$, $XAl_mO_n$, with X chosen from Mg, Ca, Sr, Y, lanthanide oxides and their mixtures, m being an integer such that 10 ≤ m ≤ 12 and n being an integer such that 16 ≤ n ≤ 20, $Mg_3Al_2(SiO_4)_3$, $ZrSiO_4$, yttrium silicates, it being possible for the yttrium to be partially replaced, $X_2ZSi_2O_7$, with X chosen from Y, lanthanide oxides and their mixtures and Z chosen from Mg, Al and their mixtures, $Mg_2Al_3(Si_5AlO_{18})$, $(Ca,sr)Al_2Si_2O_8$, $3(Al_2O_3)2(SiO_2)$, SiAlON phases, and their mixtures, and
  - optionally less than 10% of a third crystalline phase composed of a compound chosen from oxides of perovskite structure, oxides of spinel structure, oxides of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and their mixtures, oxides of hematite structure $E_2O_3$, the element E being chosen from the group $G_E(1)$ formed by mixtures of aluminum and chromium, mixtures of aluminum and manganese, and their mixtures, orthosilicates chosen from the group of zirconium and praseodymium orthosilicates $(Zr,Pr)SiO_4$, zirconium and vanadium orthosilicates $(Zr,V)SiO_4$, zirconium orthosilicates in which iron oxide is found in inclusion, and their mixtures,
  - less than 5% of other crystalline phases,
- optionally an amorphous part comprising, as percentage by weight on the basis of the amorphous part and for a total of 100%:
  - a first vitreous amorphous phase having the composition $X_xAl_aSi_bO_c$ with X chosen from Mg, Ca, Sr, Sc, Y, lanthanide oxides, Ti, Zr, Fe, Mn, Co, Cr and their mixtures, x, a, b and c being integers such that x+a>0, c>0, b>0, a/b ≤ 2 and x/b ≤ 1,
  - less than 10% of other amorphous phases,
- the sum of the contents by weight of second crystalline phase and of first amorphous phase being greater than 10% and less than 50%,
- a SiAlON phase being a phase observing one of the following formulae:
  - $Si_tAl_wO_uN_v$, in which:
    - t is greater than or equal to 0 and less than or equal to 1,
    - w is greater than or equal to 0 and less than or equal to 1,
    - u is greater than or equal to 0 and less than or equal to 1,
    - v is greater than 0 and less than or equal to 1,
    - t+w>0,
    - t, w, u and v being stoichiometric indices standardized with respect to the highest one, rendered equal to 1;
  - $Me_sSi_{12-(q+r)}Al_{(q+r)}O_rN_{16-r}$, with 0 ≤ s ≤ 2, Me a cation chosen from cations of lanthanides, Fe, Y, Ca, Li and their mixtures, 0 ≤ q ≤ 12, 0 ≤ r ≤ 12 and q+r ≤ 12.

2. The device as claimed in claim 1, in which the density of the sintered product is greater than 90% of the theoretical density.

3. The device as claimed in claim 1, in which said sintered product is such that:
the mean size of the zirconia grains is less than 10 μm, and/or
the mean size of the grains of the second crystalline phase is less than 50 μm, and/or
the mean size of the grains of the third crystalline phase is less than 1 μm.

4. The device as claimed in claim 1, in which said sintered product exhibits a zirconia content of greater than 48%, as percentage by weight.

5. The device as claimed in claim 1, in which said sintered product exhibits a zirconia content of less than 83%, as percentage by weight.

6. The device as claimed in claim 1, in which said sintered product exhibits a composition such that the $Y_2O_3$ content is greater than 1% and less than 8% and the $CeO_2+Sc_2O_3+MgO+CaO$ content is less than 2%.

7. The device as claimed in claim 1, in which said sintered product exhibits a composition such that:
the $CeO_2$ content is greater than 4% and less than 14%, and the $Y_2O_3+Sc_2O_3+MgO+CaO$ content is less than 2%, and/or
the $Y_2O_3+CeO_2+Sc_2O_3+MgO+CaO$ content is less than 18% and the CaO+MgO content is less than 5%, and/or
the $Y_2O_3+Sc_2O_3$ content is less than 7.5% and the CeO+MgO+CaO content is less than 2%, and/or
the $3.Y_2O_3+CeO_2$ content is greater than 4% and less than 18%, and the $Sc_2O_3+MgO+CaO$ content is less than 2%, and/or
the MgO content is greater than 0.7% and less than 34%, and/or
the $Al_2O_3$ content is greater than 2.5% and less than 46%, and/or
the $La_2O_3$ content is greater than 3.5% and less than 28%, and/or
the $SiO_2$ content is greater than 2.5% and less than 34%, and/or
the CaO content is greater than 2% and less than 20%, and/or
the SrO content is greater than 3% and less than 16%, and/or
the $Y_2O_3$ content is greater than 6.5% and less than 37%, and/or
the $Sc_2O_3$ content is greater than 5% and less than 31%.

8. The device as claimed in claim 1, in which said sintered product exhibits a crystalline part comprising more than 50% and less than 85%, as percentage by weight on the basis of the crystalline part, of a crystalline phase composed of zirconia, more than 80% of said zirconia being stabilized by means of a stabilizer in a quadratic and/or cubic form, the remainder being in a monoclinic form.

9. The device as claimed in claim 1, in which said sintered product exhibits a crystalline part comprising more than 15% and less than 40%, preferably less than 30%, preferably less than 25%, as percentage by weight on the basis of the crystalline part, of a second crystalline phase composed of a compound chosen from $MgAl_2O_4$, $XAl_mO_n$, with X chosen from Mg, Ca, Sr, Y, lanthanide oxides and their mixtures, m being an integer such that 10≤m≤12, and n being an integer such that 16≤n≤20, $Mg_3Al_2(SiO_4)_3$, $ZrSiO_4$, yttrium silicates, it being possible for the yttrium to be partially replaced, $X_2ZSi_2O_7$, with X chosen from La, Y, lanthanide oxides and their mixtures and Z chosen from Mg, Al and their mixtures, $Mg_2Al_3(Si_5AlO_{18})$, $(Ca,Sr)Al_2Si_2O_8$, $3(Al_2O_3)2(SiO_2)$, SiAlON phases, and their mixtures.

10. The device as claimed in claim 1, in which said sintered product exhibits, as percentage by weight on the basis of the weight of the product and for a total of more than 95%:
an $Al_2O_3$ content of greater than 9% and less than 55%, and
a zirconia content of greater than 40% and less than 93%, and
a $Y_2O_3+CeO_2+Sc_2O_3+MgO+CaO$ sum of less than 31% and a CaO+MgO content of less than 18%, with a MgO content of greater than 0.7% and less than 13%, and
the $MgAl_{12}O_{19}$ content being between 10% and 50%, as percentage by weight on the basis of the crystalline part, and
the crystalline part representing more than 60% of the sintered product, as percentage by weight on the basis of the sintered product,
or, as percentage by weight on the basis of the weight of the product and for a total of more than 95%
an $La_2O_3$ content of greater than 2% and less than 20%, and
an $Al_2O_3$ content of greater than 7% and less than 48%, and
a zirconia content of greater than 40% and less than 93%, and
a $Y_2O_3+CeO_2+Sc_2O_3+MgO+CaO$ sum of less than 18% and a CaO+MgO content of less than 5%, and
the $LaAl_{11}O_{18}$ content being between 10% and 50%, as percentage by weight on the basis of the crystalline part, and
the crystalline part representing more than 60% of the sintered product, as percentage by weight on the basis of the sintered product,
or,
as percentage by weight on the basis of the weight of the product and for a total of more than 95%:
an $Al_2O_3$ content of greater than 2.5% and less than 21%, and
a $SiO_2$ content of greater than 4.5% and less than 31%, and
a zirconia content of greater than 40% and less than 93%, and
a $Y_2O_3+CeO_2+Sc_2O_3+MgO+CaO$ sum of less than 42% and less than 18% and a CaO+MgO content of less than 29%, with a MgO content of greater than 3% and less than 24%, the $Mg_3Al_2(SiO_4)_3$ content being between 3% and 44%, a percentage by weight on the basis of the crystalline part, and
the crystalline part representing more than 62% and less than 93% of the sintered product, as percentage by weight on the basis of the sintered product, and
the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part,
or,
as percentage by weight on the basis of the weight of the product and for a total of more than 95%:
a $SiO_2$ content of greater than 3% and less than 26%, and
a zirconia content of greater than 40% and less than 93%, and
a $Y_2O_3+CeO_2+Sc_2O_3+MgO+CaO$ sum of less than 18% and a CaO+MgO content of less than 5%,
the $ZrSiO_4$ content being between 8% and 50%, as percentage by weight on the basis of the crystalline part, and
the crystalline part representing more than 70% and less than 95% of the sintered product, as percentage by weight on the basis of the sintered product, and the amorphous part comprising more than 90% of a vitreous amorphous phase having the composition $X_xAl_aSi_bO_c$ with X chosen from Mg, Ca, Sr, Sc, Y, lanthanide oxides, Ti, Zr, Fe, Mn, Co, Cr and their mixtures, x, a, b and c being integers such that x+a>0, c>0, b>0, a/b≤2 and x/b≤1, as percentage by weight on the basis of the amorphous part, or, as percentage by weight on the basis of the weight of the product and for a total of more than 95%:
  an $Al_2O_3$ content of greater than 3.5% and less than 26%, and
  a $SiO_2$ content of greater than 4% and less than 29%, and
  a zirconia content of greater than 40% and less than 93%, and
  a $Y_2O_3$+CeO+$Sc_2O_3$+MgO+CaO sum of less than 39% and a CaO+MgO content of less than 26%, with a CaO content of greater than 2.5% and less than 21%,
the crystalline part representing more than 57% and less than 86% of the sintered product, as percentage by weight on the basis of the sintered product, and
the amorphous part comprising more than 90% of a vitreous amorphous phase having the composition $XxAl_aSi_bO_c$, with X chosen from Ca and optionally Mg, Sr, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part, or as percentage by weight on the basis of the weight of the product and for a total of more than 95%:
  a $SiO_2$ content of greater than 3.5% and less than 26%, and
  a zirconia content of greater than 40% and less than 93%, and
  a $Y_2O_3$+$CeO_2$+$Sc_2O_3$+MgO+CaO sum of less than 56% and CaO+MgO content of less than 26%, with a $Y_2O_3$ content of greater than 6.5% and less than 38%, and
the $Y_2Si_2O_7$ content being greater than 5% and less than 33%, as percentage by weight on the basis of the crystalline part, and
the crystalline part representing more than 57% and less than 90% of the sintered product, as percentage by weight on the basis of the sintered product, and
the amorphous part comprising more than 90% of a vitreous amorphous phase having the composition $X_xAl_aSi_bO_c$, with X chosen from Y and optionally Mg, Ca, Sr, Sc, lanthanide oxides, Ti, Zr, Fe, Mn, Co, Cr and their mixtures, x, a, b and c being integers such that x>0, x+a>0, c>0, b>0, a/b≤2 and x/b≤1, as percentage by weight on the basis of the amorphous part, or, as percentage by weight on the basis of the weight of the product and for a total of more than 95%:
  a $SiO_2$ content of greater than 4.5% and less than 32%, and
  an $Sc_2O_3$ content of greater than 5% and less than 36%, and
  a zirconia content of greater than 40% and less than 93%, and
  a $Y_2O_3$+$CeO_2$+$Sc_2O_3$+MgO+CaO sum of less than 54% and a CaO+MgO content of less than 5%,
the $Sc_2Si_2O_7$ content being greater than 5% and less than 33%, as percentage by weight on the basis of the crystalline part, and
the crystalline part representing more than 57% and less than 90% of the sintered product, as percentage by weight on the basis of the sintered product, and
the amorphous part comprising more than 90% of a vitreous amorphous phase having the composition $X_xAl_aSi_bO_c$, with X chosen from Sc and optionally Mg, Ca, Sr, Sc, lanthanide oxides, Ti, Zr, Fe, Mn, Co, Cr and their mixtures, x, a, b and c being integers such that x>0, x+a>0, c>0, b>0, a/b≤2 and x/b≤1, as percentage by weight on the basis of the amorphous part, or, as percentage by weight on the basis of the weight of the product and for a total of more than 95%,
  an $Al_2O_3$ content of greater than 2.5%, and less than 23%, and
  a $SiO_2$ content of greater than 5.5% and less than 37%, and
  a zirconia content of greater than 40% and less than 93%, and
  a $Y_2O_3$+$CeO_2$+$Sc_2O_3$+MgO+CaO sum of less than 34.5% and a CaO+MgO content of less than 21.5%, with a MgO content of greater than 1.5% and less than 16.5%,
the $Mg_2Al_3(Si_5AlO_{18})$ content being greater than 5% and less than 33%, as percentage by weight on the basis of the crystalline part, and
the crystalline part representing more than 57% and less than 90% of the sintered product, as percentage by weight on the basis of the sintered product, and
the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part, or, as percentage by weight on the basis of the weight of the product and for a total of more than 95%:
  a $SiO_2$ content of greater than 6.5% and less than 42%, and
  a zirconia content of greater than 40% and less than 93%, and
  a $Y_2O_3$+$CeO_2$+$Sc_2O_3$+MgO+CaO sum of less than 43% and a CaO+MgO content of less than 30%, with a MgO content of greater than 3% and less than 25%,
the crystalline part representing more than 57% and less than 86% of the sintered product, as percentage by weight on the basis of the sintered product, and
the amorphous part comprising more than 90% of a vitreous amorphous phase having the composition $X1Al_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0, a+x>0, b>0, a/b≤2 and x/b≤1, as percentage by weight on the basis of amorphous part, or, as percentage by weight on the basis of the weight of the product and for a total of more than 95%:
  an $Al_2O_3$ content of greater than 3.5% and less than 27%, and
  a $SiO_2$ content of greater than 4% and less than 30%, and
  a zirconia content of greater than 40% and less than 93%, and
  a $Y_2O_3$+$CeO_2$+$Sc_2O_3$+MgO+CaO sum of less than 37% and a CaO+MgO content of less than 24%, with a CaO content of greater than 2% and less than 19%,
the crystalline part representing more than 57% and less than 86% of the sintered product, as percentage by weight on the basis of the sintered product, and
the amorphous part comprising more than 90% of a vitreous amorphous phase having the composition $X_xAl_aSi_bO_c$, with X chosen from Ca and optionally Mg, Sr, Sc, Y, lanthanide oxides, Ti, Zr, Fe, Mn, Co, Cr and their mixtures, x, a, b and c being integers such that x>0, a>0, b>0, a/b≤2 and x/b≤1, as percentage by weight on the basis of the amorphous part, or, as percentage by weight on the basis of the weight of the product and for a total of more than 95%:
- an $Al_2O_3$ content of greater than 3% and less than 24%, and
- an SrO content of greater than 3% and less than 25%, and
- a $SiO_2$ content of greater than 3.5% and less than 27%, and
- a zirconia content of greater than 40% and less than 93%, and
- a $Y_2O_3+CeO_2+Sc_2O_3+MgO+CaO$ sum of less than 18% and
- a CaO+MgO content of less than 5%, the $(Sr,Ca)Al_2Si_2O_8$ content being greater than 5% and less than 33%, as percentage by weight on the basis of the crystalline part, and the crystalline part representing more than 57% and less than 90% of the sintered product, as percentage by weight on the basis of the sintered product, and the amorphous part comprising more than 90% of a vitreous amorphous phase having the composition $X_xAl_aSi_bO_c$, with X chosen from Sr and/or Ca and optionally Mg, Sc, Y, lanthanide oxides, Ti, Zr, Fe, Mn, Co, Cr and their mixtures, x, a, b and c being integers such that x>0, a>0, c>0, b>0, a/b≤2 and x/b≤1, as percentage by weight on the basis of the amorphous part, or, as percentage by weight on the basis of the weight of the product and for a total of more than 95%:
- an $Al_2O_3$ content of greater than 7% and less than 45%, and
- a $SiO_2$ content of greater than 2.5% and less than 23%, and
- a zirconia content of greater than 40% and less than 93%, and
- a $Y_2O_3+CeO_2+Sc_2O_3+MgO+CaO$ sum of less than 18% and a CaO+MgO content of less than 5%, the $3(Al_2O_3)2(SiO_2)$ content being greater than 5% and less than 33%, as percentage by weight on the basis of the crystalline part, and the crystalline part representing more than 57% and less than 90% of the sintered product, as percentage by weight on the basis of the sintered product, and the amorphous part comprising more than 90% of a vitreous amorphous phase having the composition $X_xAl_aSi_bO_c$, with X chosen from Sr, Ca, Mg, Sc, Y, lanthanide oxides, Ti, Zr, Fe, Mn, Co, Cr and their mixtures, x, a, b and c being integers such that a>0, a+x>0, c>0, b>0, a/b≤2 and x/b≤1, as percentage by weight on the basis of the amorphous part, or, as percentage by weight on the basis of the weight of the product and for a total of more than 95%:
- an $Al_2O_3$ content of greater than 4.5% and less than 32%, and
- a $SiO_2$ content of greater than 5% and less than 36%, and
- a zirconia content of greater than 40% and less than 93%, and
- a $Y_2O_3+CeO_2+Sc_2O_3+MgO+CaO$ sum of less than 18% and a CaO+MgO content of less than 5%, the $Al_2O_3SiO_2$ content being greater than 5% and less than 33%, as percentage by weight on the basis of the crystalline part, and the crystalline part representing more than 57% and less than 90% of the sintered product, as percentage by weight on the basis of the sintered product, and the amorphous part comprising more than 90% of a vitreous amorphous phase having the composition $X_xAl_aSi_bO_c$, with X chosen from Sr, Ca, Mg, Sc, Y, lanthanide oxides, Ti, Zr, Fe, Mn, Co, Cr and their mixtures, x, a, b and c being integers such that a>0, c>0, b>0, a/b≤2 and x/b≤1, as percentage by weight on the basis of the amorphous part, or, as percentage by weight on the basis of the weight of the product and for a total of more than 95%:
- an $Al_2O_3$ content of greater than 2.5% and less than 21%, and
- a $SiO_2$ content of greater than 6% and less than 40%, and
- a zirconia content of greater than 40% and less than 93%, and
- a $Y_2O_3+CeO_2+Sc_2O_3+MgO+CaO$ sum of less than 32% and a CaO+MgO content of less than 19%, with a MgO content of greater than 1% and less than 14%, the crystalline part representing more than 57% and less than 86% of the sintered product, as percentage by weight on the basis of the sintered product, and the amorphous part comprising more than 90% of a vitreous amorphous phase having the composition $X_xAl_aSi_bO_c$, with X chosen from Mg and optionally Ca, Sr, Sc, Y, lanthanide oxides, Ti, Zr, Fe, Mn, Co, Cr and their mixtures, x, a, b and c being integers such that x>0 <Mg and Al in vitreous phase necessarily>, a>0, c>0, b>0, a/b≤2 and x/b≤1, as percentage by weight on the basis of the amorphous part.

11. A process comprising the following stages:
a) preparation of a starting charge by way of a particulate mixture,
b) forming a preform from said starting charge,
c) sintering said preform, such as to obtain a sintered part,
d) optionally, polishing said sintered part,
e) optionally, confirmation of the color of the sintered part,
f) assembling the sintered part so that it constitutes a housing of a communication device according to claim 1, the particulate mixture comprising, as percentage by weight and for a total of 100%:

between 40% and 88% of a first particulate fraction composed of zirconia $ZrO_2$ particles and comprising a compound capable of stabilizing the zirconia, said compound capable of stabilizing the zirconia stabilizing or not stabilizing said zirconia and being chosen from $Y_2O_3$, $Sc_2O_3$, MgO, CaO, $CeO_2$ and their mixtures, and present in an amount of greater than 2.0% and less than 20.0%, calculated on the basis of the sum of $ZrO_2$, $Y_2O_3$, $Sc_2O_3$, MgO, CaO and $CeO_2$, the MgO+CaO content being less than 5.0% on the basis of the sum of $ZrO_2$, $Y_2O_3$, $Sc_2O_3$, MgO, CaO and $CeO_2$, it being possible for the compound capable of stabilizing the zirconia to be replaced by an equivalent amount of precursor(s) of this compound, between 10% and 50% of a second particulate fraction composed of particles made of a compound of formula $XAl_mO_n$, with X chosen from Mg, Ca, Sr, Y, lanthanide oxides and their mixtures, m being an integer such that 10≤m≤12 and n being an integer such that 16≤n≤20, and/or of particles made of a compound of formula $X_xAl_aSi_bO_c(OH)_y(H_2O)_z$, with X chosen from Mg, Ca, Sr, Sc, Y, lanthanide oxides, Ti, Zr, Fe, Mn, Co, Cr and their mixtures, x, a, b, c, y and z being integers such that x+a>0, c>0, b>0, a/b≤2, x/b≤1, y≤3(a+x) and z b, and/or of SiAlON particles and/or of particles made of a mixture of these compounds, less than 10% of a third particulate fraction composed of particles made of an oxide of perovskite structure, optionally replaced, totally or partially, by an equivalent amount of precursor(s) of this oxide, and/or of particles made of an oxide of spinel structure and/or of particles made of an oxide of rutile structure $FO_2$, the element F being chosen from the group $G_F(1)$ formed by mixtures of tin and vanadium, mixtures of titanium and chromium and niobium, mixtures of titanium and chromium and tungsten, mixtures of titanium and niobium and manganese, mixtures of tin and chromium, and their mixtures, and/or of particles made of an oxide of hematite structure $E_2O_3$, the element E being chosen from the group $G_E(1)$ formed by mixtures of aluminum and chromium, mixtures of aluminum and manganese, and their mixtures, and/or of particles made of a compound chosen from the group of the zirconium and praseodymium orthosilicates $(Zr,Pr)SiO_4$, zirconium and vanadium orthosilicates $(Zr,V)SiO_4$, zirconium orthosilicates in which iron oxide is found in inclusion, and their mixtures, and/or of particles made of a mixture of these compounds, less than 2% of a fourth particulate fraction composed of other particles, a SiAlON phase being a phase observing one of the following formulae:

$Si_t Al_w O_u N_v$, in which:

t is greater than or equal to 0 and less than or equal to 1,
w is greater than or equal to 0 and less than or equal to 1,
u is greater than or equal to 0 and less than or equal to 1,
v is greater than 0 and less than or equal to 1,
t+w>0,
t, w, u and v being stochiometric indices standardized with respect to the highest one, rendered equal to 1;

$Me_s Si_{12-(q+r)} Al_{(q+r)} O_r N_{16-r}$, with $0 \leq s \leq 2$, Me a cation chosen from cations of lanthanides, Fe, Y, Ca, Li and their mixtures, $0 \leq q \leq 12$, $0 \leq r \leq 12$ and $q+r \leq 12$.

12. The process as claimed in claim 11, in which the particulate mixture exhibits a specific surface, calculated by the BET method, of greater than 3 m$^2$/g and less than 30 m$^2$/g.

13. The process as claimed in claim 11, in which the first particulate fraction represents more than 70% and/or less than 85% of the particulate mixture, as percentage by weight and/or the median size of the particles of the first particulate fraction of the particulate mixture is between 100 nm and 1000 nm.

14. The process as claimed in claim 11, in which the second particulate fraction represents more than 15% and/or less than 40% of the particulate mixture, as percentage by weight and or the median size of the particles of the second particulate fraction of the particulate mixture is between 100 nm and 10 000 nm.

15. The process as claimed in claim 11, in which more than 25% by weight of the particles of the second particulate fraction exhibit a length/width ratio of greater than 3.

16. The process as claimed in claim 11, in which the second particulate fraction is composed of particles made of a compound of formula $XAl_m O_n$, with)(chosen from Mg, Ca, Sr, Y, lanthanide oxides and their mixtures, m being an integer such that $10 \leq m \leq 12$ and n being an integer such that $16 \leq n \leq 20$, and/or of particles made of a compound of formula $X_x Al_a Si_b O_c (OH)_y (H_2O)_z$, with X chosen from Mg, Ca, Sr, Sc, Y, lanthanide oxides, Ti, Zr, Fe, Mn, Co, Cr and their mixtures, x, a, b, c, y and z being integers such that x+a>0, c>0, b>0, a/b≤2, x/b≤1, y≤3(a+x) and z≤b, and/or of $Si_3N_4$ particles and/or of AlN particles and/or of AlON particles and/or of $Si_2ON_2$ particles and/or of particles made of a mixture of these compounds.

17. The process as claimed claim 11, in which the median size of the particles of the third particulate fraction is less than 1000 nm.

18. The process as claimed in claim 11, in which the fourth particulate fraction represents less than 0.5% of the particulate mixture, as percentage by weight.

19. The process as claimed claim 11, in which the oxides represent more than 98% of the weight of the particulate mixture.

20. The process as claimed in claim 11, in which, in stage c), the preform is sintered at a temperature of between 1200° C. and 1500° C.

* * * * *